(12) United States Patent  
Amin

(10) Patent No.: US 12,113,442 B2
(45) Date of Patent: Oct. 8, 2024

(54) STACKED BUCK CONVERTER WITH INDUCTOR SWITCHING NODE PRE-CHARGE AND CONDUCTION MODULATION CONTROL

(71) Applicant: Intel Corporation, Santa Clara, CA (US)

(72) Inventor: Sally Amin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 17/132,814

(22) Filed: Dec. 23, 2020

(65) Prior Publication Data

US 2021/0152090 A1    May 20, 2021

(51) Int. Cl.
*H02M 3/158*    (2006.01)
*G06F 1/3287*    (2019.01)

(52) U.S. Cl.
CPC ........ *H02M 3/1584* (2013.01); *G06F 1/3287* (2013.01)

(58) Field of Classification Search
CPC ........................... G06F 1/3287; H02M 3/1584
USPC ....................................................... 713/320
See application file for complete search history.

(56) References Cited

U.S. PATENT DOCUMENTS

| | | | | |
|---|---|---|---|---|
| 6,163,199 A | * | 12/2000 | Miske | H03K 17/6872 327/434 |
| 6,184,718 B1 | * | 2/2001 | Tran | H03K 19/0963 326/98 |
| 9,985,526 B1 | * | 5/2018 | Oak | H02M 3/33507 |
| 10,348,200 B2 | * | 7/2019 | Mahajan | H02M 3/158 |
| 10,976,764 B2 | * | 4/2021 | Rodriguez | H02M 3/157 |
| 11,201,544 B2 | * | 12/2021 | Zambetti | H02M 3/1584 |
| 11,356,017 B2 | * | 6/2022 | Amin | H02M 3/158 |
| 2014/0002049 A1 | * | 1/2014 | Schrom | H02M 3/1588 323/311 |

* cited by examiner

*Primary Examiner* — Brian T Misiura
(74) *Attorney, Agent, or Firm* — Schwabe, Williamson & Wyatt, P.C.

(57) ABSTRACT

A stacked voltage regulator (VR) that pre-charges inductor switching node to mitigate EOS. The stacked VR comprises at least three n-type devices (low-side) and three p-type devices (high-side) coupled in series. The three p-type stacked devices are part of a high-side of the VR. Node Vx coupling one of the n-type devices and one of the p-type devices is coupled to an inductor, which is also coupled to a load capacitor. During the inductor charging phase, in the low-to-high transition, a small p-type device is added to pre-charge the inductor switching node ($V_x$) from "0" to "VDD–Vth" through the low-side by connecting a generated mid-rail "Vdd" to the internal node of the n-type stack for a short period (e.g., about 50 ps). A controlled conductance modulation (CCM) scheme on the high-side top switch during the inductor charging phase is used to mitigate the ringing without controlling the gate drive strength.

20 Claims, 18 Drawing Sheets

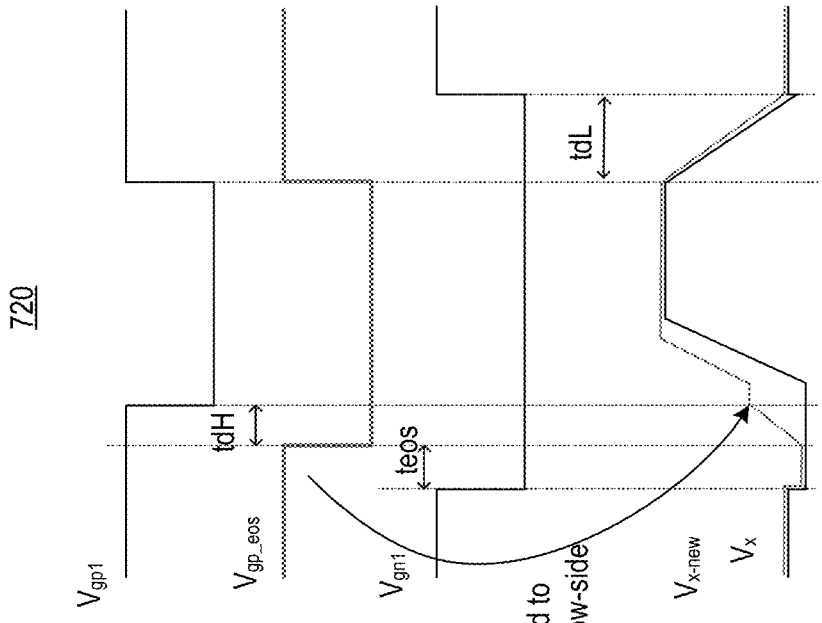
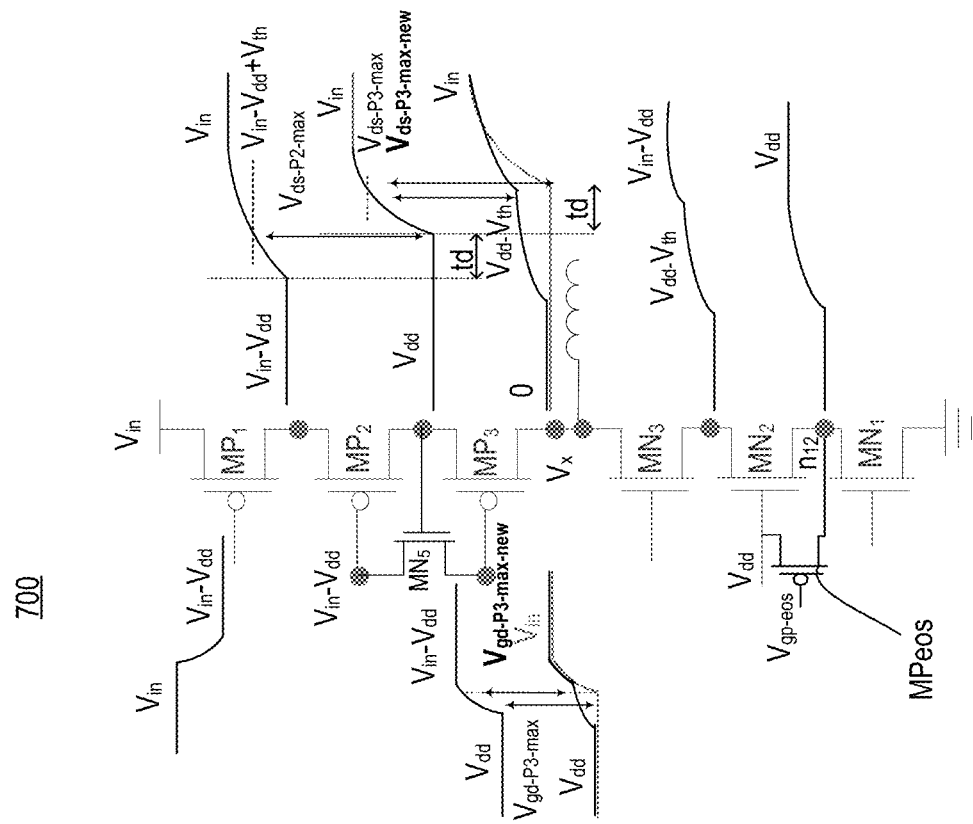
Fig. 7A
Fig. 7B

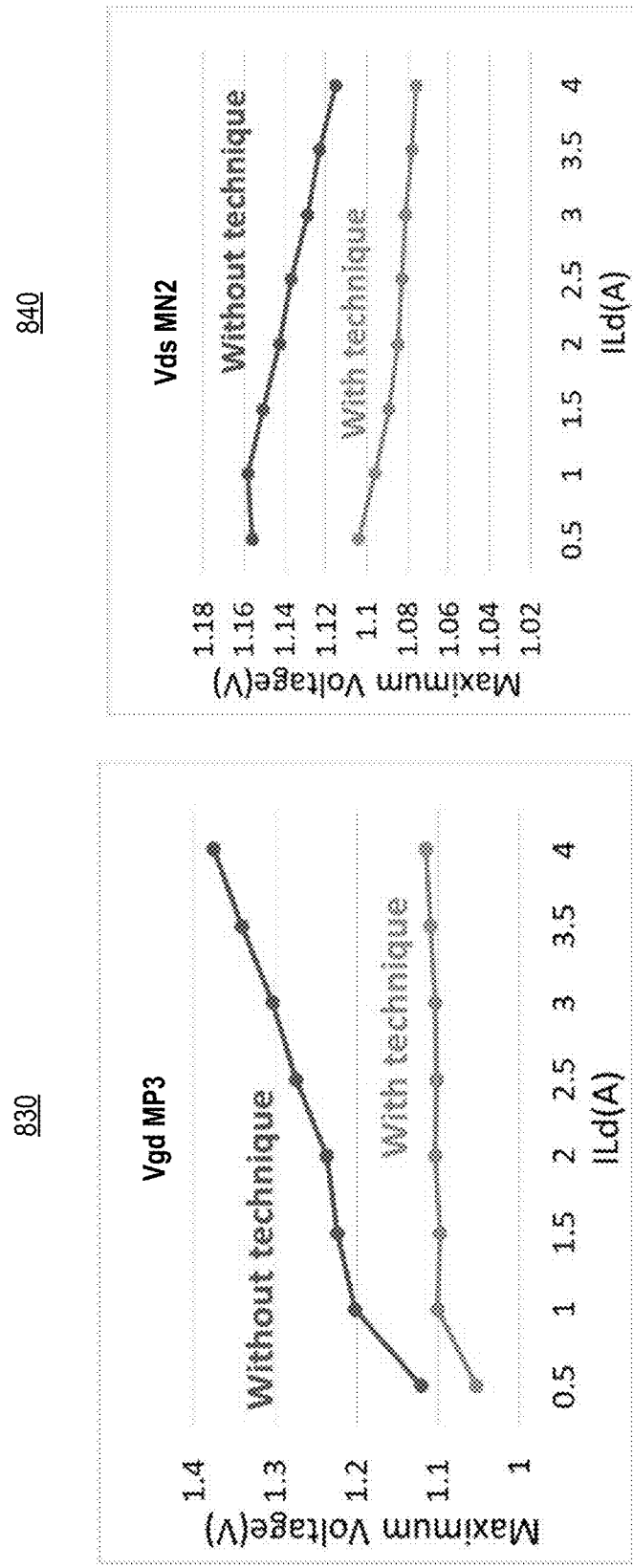

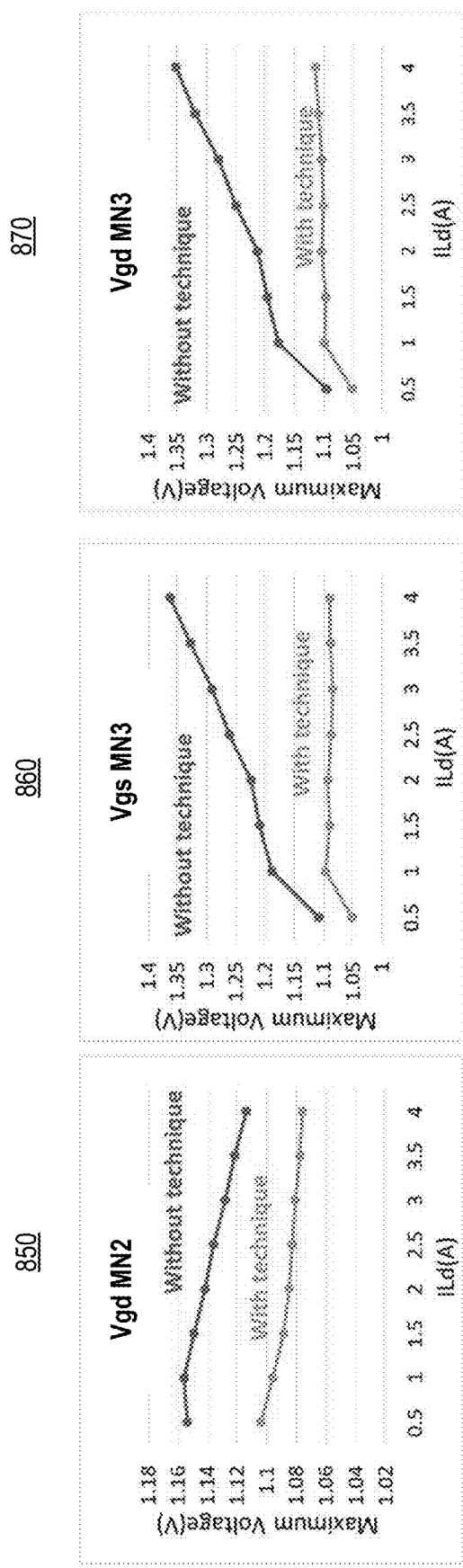

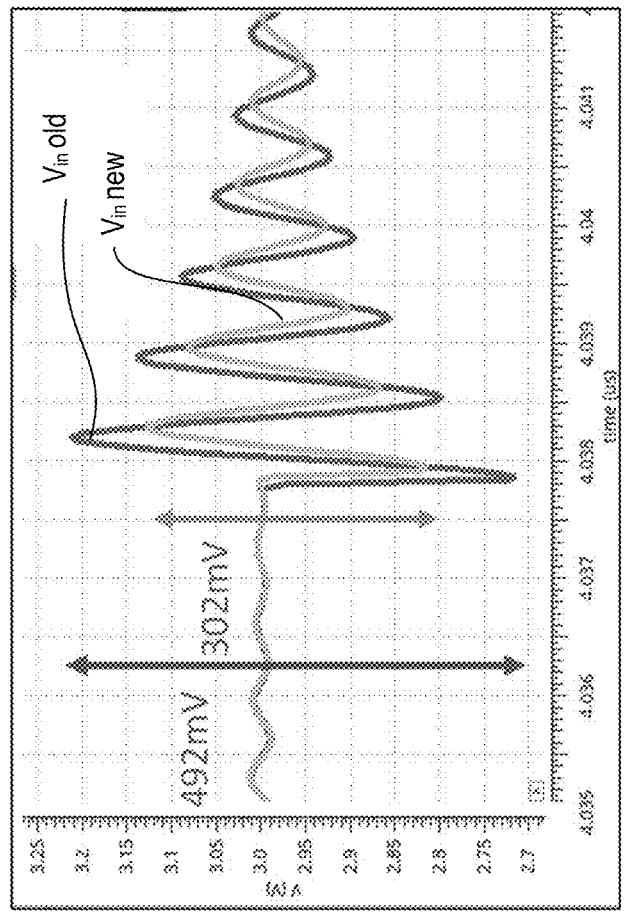
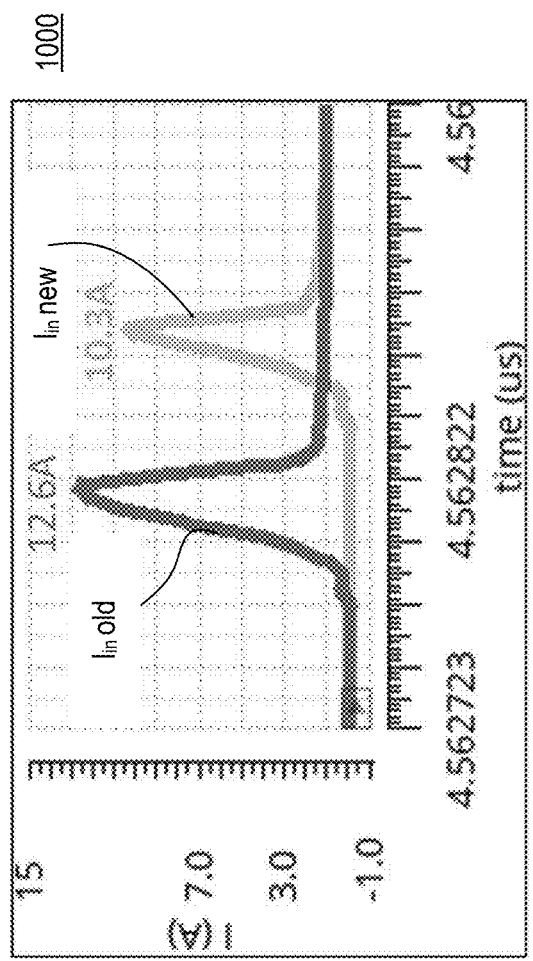
Fig. 10A
Fig. 10B

STACKED BUCK CONVERTER WITH INDUCTOR SWITCHING NODE PRE-CHARGE AND CONDUCTION MODULATION CONTROL

BACKGROUND

Stacking thin-oxide low voltage transistors in scaled Complementary Metal Oxide Semiconductor (CMOS) process enables blocking higher voltages and implementing high input supply voltage (e.g., 3 V or more) based voltage regulators (VRs) while achieving higher efficiency and switching frequency converters in smaller form factor compared to thick oxide transistors. However, electrical overstress (EOS) on the stacked thin-oxide power switches is a challenge. EOS, which is a stress caused by exceeding the gate-to-source (Vgs) and drain-to-source (Vds) maximum allowed voltage rating, results in gate oxide break-down and increased transistor aging. EOS in stacked buck converters results from an imbalance of each Metal Oxide Semiconductor Field Effect Transistor (MOSFET) Vds and the high-side (PMOS) stack charging sequencing which results in |Vds|, |Vgd|, and |Vgs| violation in the high-side PMOS stack and the low-side NMOS stack.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 7A-B illustrate a three-stack power stage with EOS mitigation, and associated timing diagram, respectively, in accordance with some embodiments.

FIGS. 8A-G illustrate a set of plots showing EOS mitigation using the three-stack power stage, in accordance with some embodiments.

FIGS. 10A-B illustrate a set of plots showing improvement in EMI mitigation and power supply ringing using the three-stack power stage, in accordance with some embodiments.

DETAILED DESCRIPTION

Figure 1:
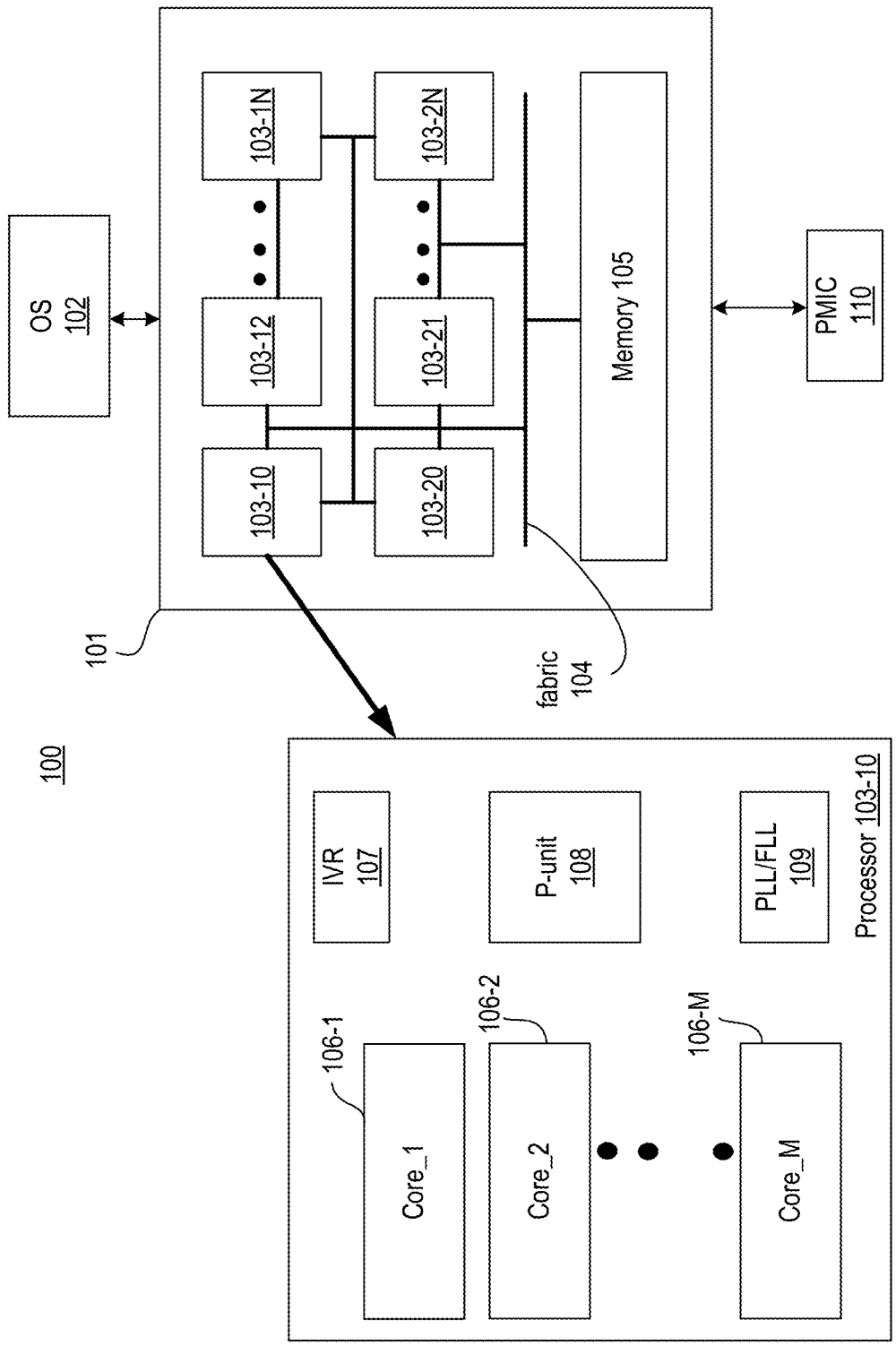
FIG. 1 illustrates a processor with integrated voltage regulator having stacked buck power stage, in accordance with some embodiments.

EOS can be managed by reducing the input supply voltage $V_{in}$ to the voltage regulator to close to 1 V, or by using thick-gate devices. However, reducing the input supply voltage $V_{in}$ to the power stage (or bridge) does not make full utilization of the high-voltage blocking capability of stacked transistors. Also, adapting thick-gate devices degrades the efficiency of the voltage regulator (VR) and increases the area of the voltage regulator significantly.

Some embodiments describe a stacked voltage regulator that pre-charges inductor switching node to mitigate EOS. The stacked voltage regulator comprises at least three n-type devices and three p-type devices coupled in series. The three n-type stacked devices are part of a low-side of the VR. The three p-type stacked devices are part of a high-side of the VR. Here, high-side of the VR refers to transistors that source current to the inductor, while low-side of the VR refers to transistors that sink current from the inductor to ground. The node $V_x$ coupling one of the n-type devices and one of the p-type devices is coupled to an inductor, which is also coupled to a load capacitor. Here, $V_x$ is the switching node that couples the high-side to the low-side. $V_x$ node is coupled to the inductor. In some embodiments, during the inductor charging phase, in the low-to-high transition, a small p-type device is added to pre-charge the inductor switching node ($V_x$) from "0" to "VDD−Vth" through the low-side by connecting a generated mid-rail "Vdd" to the internal node of the n-type stack for a short period (e.g., about 50 ps). Hence, the high side p-type device turns ON when "$V_x$=Vdd−Vth" to charge the $V_x$ node from "Vdd−Vth" to $V_{in}$, thereby reducing the EOS stress on both the n-type and p-type ($V_{gd}/V_{ds}$) devices.

There are many technical effects of various embodiments. For example, the apparatus of some embodiments also acts like soft switching (ZVS) so it has multiple benefits in addition to EOS mitigation including efficiency improvement, reduced electromagnetic interference (EMI), and reduction in supply ringing. The apparatus of some embodiments enables reliable high-efficiency and high-voltage VR for system-on-chip (SoC) and eliminates the need (or substantially eliminates the need) for two stage converters to improve the overall efficiency and reduce the area. Bringing in higher input supply voltage VR minimizes the input current which highly reduces the power distribution losses (RLoss) in higher current application like servers and graphics processor unit (GPU). The higher frequency operation, around 40-80 MHz, can facilitate enabling magnetic material-based inductors which can eliminate the inductor footprint on the client platforms that are currently a dominating large area. Further, with the magnetic based inductors better efficiency is achieved as compared to an air core inductor, thus resulting in an overall improvement in efficiency. The apparatus of various embodiments leads to high input supply voltage support, high switching frequency, and high efficiency power conversion resulting in a significant improvement in the key performance indicators (KPIs) of an integrated voltage regulator (IVR) in terms of power density, area on the board and improved load-lines. Other technical effects will be evident from the various embodiments and figures.

As discussed herein, bringing in higher input supply voltage Vin to a VR minimizes the input current which highly reduces the power distribution losses in higher current application like servers and increases the end-to-end efficiency. However, parasitic inductor on board, in package, and/or on die (Lpar) are excited by fast switching transients during low-to-high $V_x$ node transition. Current step response at the inductor switching node, $V_x$, during inductor charging phase in an RLC (resistor-inductor-capacitor) loop generates significant ringing at the $V_x$ node. The ringing results in device electrical overstress (EOS) and degraded device reliability and maximum $V_{in}$ limit. The ringing also increases high frequency EMI and increases core losses and efficiency degradation. The ringing on $V_x$ increases AC losses at high frequency due to skin effect and efficiency degradation.

One way to mitigate ringing is to increase the damping factor of the RLC. Other methods to improve reliability include reducing the total parasitic inductor, adding RC snubbers between the $V_{in}$ node and the $V_x$ node, adding huge decoupling capacitor on the input source or using slew rate control, and lowering the input voltage, $V_{in}$, of VR to enhance VR reliability.

However, lowering the power stage $V_{in}$ may not make full utilization of the high voltage blocking capability of transistors. Techniques to increase the damping factor, $$\xi = \frac{Rds}{2}\sqrt{\frac{Lpar}{Coss}}$$

include reducing the total parasitic inductor, and such techniques are expensive and constraint by packaging technology. RC snubbers results in increase in area and efficiency degradation while the huge decoupling capacitors used for ringing mitigation increase area. Also, the slew rate control results in overlap losses, efficiency degradation, hence, tradeoff between EMI/EOS and efficiency. The slew rate control turns on the large high-side switch of the VR slowly (increasing $T_f$) by controlling the gate drive strength, hence result in high overlap losses ($P_{ov}$=0.5 $V_{in}$ ($T_r$+$T_f$)$F_{sw}I_{Ld}$) and efficiency degradation, where $T_r$ is rise time of voltage on the gate of the high-side switch, $T_f$ is the fall time of voltage on the gate of the high-side switch, Fsw is the switching frequency of the signal on node $V_x$ and $I_{Ld}$ is the current through the inductor.

Some embodiments describe an apparatus that performs controlled conductance modulation (CCM) on the high-side (HS) top switch during the inductor charging phase (i.e., during turn-on of HS) to mitigate the ringing without controlling the gate drive strength, hence, there is no additional overlap losses as in the traditional slew rate control. In some embodiments, the top power switch of the power train is split into small and large power switches. The small power switch turns ON first for three reasons: 1) making the ON-resistance small during transition, hence increasing the damping facto $$\xi = \frac{Rds}{2}\sqrt{\frac{Ltot}{Coss}},$$

and result in ringing mitigation (i.e.; EMI and EOS mitigation); 2) pre-charging the inductor switching node, $V_x$, by small-sized power switch before the turn ON of the large power switch, to perform soft switching at zero voltage (ZVS) across the large power switch, and (3) improving the efficiency (power loss Ploss α size of transistor) and eliminate any efficiency penalty from ringing mitigation, unlike the conventional ringing mitigation techniques. The detected low-to-high transition at $V_x$ node triggers the turn-ON of the large power switch to enable the converter small turn-on resistance Ron operation.

In some embodiments, an apparatus is provided which comprises a high-side switch comprising one or more transistors coupled in series; and a low-side switch coupled in series with the high-side switch, wherein the low-side switch comprises one or more transistors couples in series, wherein the high-side switch and the low-side switch are coupled to an inductor at a switching node. The apparatus further comprises a circuitry coupled to the high-side switch, wherein the circuitry is to perform controlled conductance modulation of the high-side switch during a charging phase of the inductor. In some embodiments, the apparatus comprises a power switch coupled in parallel to at least one transistor of the high-side switch. In some embodiments, the power switch is substantially smaller than the at least one transistor of the high-side switch. For example, the power switch is $1/10^{th}$ the size of the at least one transistor of the high-side switch. In some embodiments, the circuitry is to turn on the power switch before the high-side switch is turned on. In some embodiments, the circuitry is to pre-charge a switching node via the power switch to perform soft switching on the high-side switch or low-side switch. In some embodiments, the circuitry comprises: a detection circuit to detect low-to-high transition on the switching node; a first driver controllable by the detection circuit, wherein the first driver is to drive the at least one transistor of the high-side switch; and a second driver to drive the power switch prior to the first driver is to drive the at least one transistor of the high-side switch.

There are many technical effects of controlled conductance modulation (CCM). For example, the CCM enables EMI friendly, reliable and EOS clean, high-voltage high-frequency, and high-efficiency VR for the SoC. The CCM eliminates the use for two stage converters to improve the overall efficiency and reduce the area of the VR. Bringing in reliable higher input voltage $V_{in}$ to the VR minimizes the input current which highly reduces the power distribution losses in higher current application like servers. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates a processor with integrated voltage regulator having stacked buck power stage, in accordance with some embodiments. Processor system 100 comprises processor 101 coupled to operating system (OS) 102. Processor 101 comprises one or more processors 103 (individually labeled as processors 103_10 through 103_1N, and 103_20 through 103_2N, where 'N' is a number), fabric 104 connecting the processor 103, and memory 105. In some embodiments, each processor 103 is a die, dielet, or chiplet. Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 104 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each processor 103 may include a number of processor cores. One such example is illustrated with reference to processor 103_10. In this example, processor 103_10 includes a plurality of processor cores 106-1 through 106-M, where M is a number. The sake of simplicity, a processor core is referred by the general label 106. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core. Processor 103_10 may include an integrated voltage regulator (IVR) 107, power control unit (p-unit) 108, phase locked loop (PLL) and/or frequency locked loop (FLL) 109. The various blocks of processor 103_10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 108 is coupled to OS 102 via an interface. Here the term "interface" generally refers to software and/or hardware used to communicate with an interconnect. An interface may include logic and I/O driver/receiver to send and receive data over the interconnect or one or more wires.

In some embodiments, each processor 103 is coupled to a power supply via voltage regulator. The voltage regulator may be internal to processor system 101 (e.g., on the package of processor system 101) or external to processor system 101. In some embodiments, each processor 103 includes IVR 107 that receives a primary regulated voltage from the voltage regulator of processor system 101 and generates an operating voltage for the agents of processor 103. The agents of processor 103 are the various components of processor 103 including cores 106, IVR 107, p-unit 108, PLL/FLL 109.

Accordingly, an implementation of IVR 107 may allow for fine-grained control of voltage and thus power and performance of each individual core 106. As such, each core 106 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 106 may include an IVR to manage power supply to that core where that IVR receives input power supply from the regulated output of IVR 107 or voltage regulator of processor system 101. During power management, a given power domain of one IVR may be powered down or off when the processor core 106 is placed into a certain low power state, while another power domain of another IVR remains active, or fully powered. As such, an IVR may control a certain domain of a logic or processor core 106. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

In some embodiments, each processor 103 includes its own p-unit 108. P-unit 108 controls the power and/or performance of processor 103. P-unit 108 may control power and/or performance (e.g., IPC, frequency) of each individual core 106. In various embodiments, p-unit 108 of each processor 103 is coupled via fabric 104. As such, the p-units 108 of each processor 103 communicate with another and OS 102 to determine the optimal power state of processor system 101 by controlling power states of individual cores 106 under their domain.

P-unit 108 may include circuitry including hardware, software and/or firmware to perform power management operations with regard to processor 103. In some embodiments, p-unit 108 provides control information to voltage regulator of processor system 101 via an interface to cause the voltage regulator to generate the appropriate regulated voltage. In some embodiments, p-unit 108 provides control information to IVRs of cores 106 via another interface to control the operating voltage generated (or to cause a corresponding IVR to be disabled in a low power mode). In some embodiments, p-unit 108 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 108 is implemented as a microcontroller. The microcontroller can be an embedded microcontroller which is a dedicated controller or as a general-purpose controller. In some embodiments, p-unit 108 is implemented as a control logic configured to execute its own dedicated power management code, here referred to as pCode. In some embodiments, power management operations to be performed by p-unit 108 may be implemented externally to a processor 103, such as by way of a separate power management integrated circuit (PMIC) or other component external to processor system 101. In yet other embodiments, power management operations to be performed by p-unit 108 may be implemented within BIOS or other system software. In some embodiments, p-unit 108 of a processor 103 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit In various embodiments, p-unit 108 executes a firmware (referred to as pCode) that communicates with OS 102. In various embodiments, each processor 103 includes a PLL or FLL 109 that generates clock from p-unit 108 and input clock (or reference clock) for each core 106. Cores 106 may include or be associated with independent clock generation circuitry such as one or more PLLs to control operating frequency of each core 106 independently.

In some embodiments, IVR 107 and/or PMIC 110 includes a stacked voltage regulator that pre-charges inductor switching node to mitigate EOS. The stacked voltage regulator comprises at least three n-type devices and three p-type devices coupled in series. The three n-type stacked devices are part of a low-side of the VR. The three p-type stacked devices are part of a high-side of the VR. The node $V_x$ coupling one of the n-type devices and one of the p-type devices is coupled to an inductor, which is also coupled to a load capacitor. In some embodiments, during the inductor charging phase, in the low-to-high transition, a small p-type device is added to pre-charge the inductor switching node ($V_x$) from "0" to "VDD–$V_{th}$" through the low-side by connecting a generated mid-rail "Vdd" to the internal node of the n-type stack for a short period (e.g., about 50 ps). Hence, the high side p-type device turns ON when "$V_x$=Vdd–$V_{th}$" to charge the $V_x$ node from "Vdd–$V_{th}$" to $V_{in}$, thereby reducing the EOS stress on both the n-type and p-type ($V_{gd}/V_{ds}$) devices.

In some embodiments, IVR 107 and/or PMIC 110 includes an apparatus that performs controlled conductance modulation (CCM) on the high-side (HS) top switch during the inductor charging phase (i.e., during turn-on of HS) to mitigate the ringing without controlling the gate drive strength, hence, there is no additional overlap losses as in the traditional slew rate control. In some embodiments, the top power switch of the power train is split into small and large power switches. The small power switch turns ON first for three reasons: 1), making the ON-resistance small during transition, hence increasing the damping facto $$\xi = \frac{Rds}{2}\sqrt{\frac{Ltot}{Coss}},$$

and result in ringing mitigation (i.e.; EMI and EOS mitigation); 2) pre-charging the inductor switching node, $V_x$ by small-sized power switch before the turn ON of the large power switch, to perform soft switching at zero voltage (ZVS) across the large power switch, and (3) improving the efficiency (power loss Ploss α size of transistor) and eliminate any efficiency penalty from ringing mitigation, unlike the conventional ringing mitigation techniques. The detected low-to-high transition at $V_x$ node triggers the turn-ON of the large power switch to enable the converter small turn-on resistance Ron operation.

In some embodiments, the apparatus that performs controlled conductance modulation (CCM) and/or stacked voltage regulator that pre-charges inductor switching node to mitigate EOS is part of a chiplet integrated in a package with integrated inductors, where the high input power supply comes in to the package from a platform.

In some embodiments, the IVR or PMIC includes a switching node $V_x$ and a stacked bridge having a high-side section coupled to a low-side section via the switching node, wherein each of the high-side section and the low-side section include three transistors coupled in series. In some embodiments, a circuitry is provided to pre-charge the switching node to a high voltage before the high-side section is turned on. In some embodiments, the high-side section comprises a first transistor, a second transistor, and a third transistor coupled in series, wherein the first transistor is coupled to an input power supply node, and wherein the second transistor is coupled between the first transistor and the third transistor. In some embodiments, the low-side section comprises fourth, fifth, and sixth transistor coupled in series, wherein the fourth transistor is coupled to a ground supply node, wherein the fifth transistor is coupled between the fourth and sixth transistors. In some embodiments, the circuitry comprises a p-type transistor coupled to a gate of the fifth transistor and a drain of the fourth transistor. In some embodiments, the circuitry pre-charges the switching node for about 50 ps. The switching node is coupled to an inductor, which can be an air inductor or magnetic inductor. In various embodiments, the circuitry pre-charges the switching node to a high voltage before the first transistor is turned on.

In some embodiments, the circuitry comprises a p-type transistor coupled to a gate of the fifth transistor and a drain of the fourth transistor. In some embodiments, the p-type transistor is smaller than the fifth transistor. In some embodiments, the circuitry pre-charges the switching node to a voltage substantially equal to Vdd-$V_{th}$ through fifth and sixth transistors after the fourth transistor is turned off, where Vth is a threshold voltage of the fourth transistor, and wherein Vdd is lower than a voltage on the input power supply node. In some embodiments, a voltage on the input power supply node is greater than 3 V. In some embodiments, the high-side section or bridge comprises a seventh transistor coupled in parallel to the first transistor, wherein the seventh transistor is smaller than the first transistor.

In some embodiments, the IVR comprises a second circuitry turn on the seventh transistor before the second circuitry turns on the fifth transistor. In some embodiments, the seventh circuitry includes a first driver to drive the first transistor and a second driver to driver the seventh transistor. In some embodiments, the seventh circuitry includes a detector to detect low-to-high transition on the switching node via a voltage on a drain of the first transistor, and to turn on the seventh transistor during the low-to-high transition on the switching node. In some embodiments, the IVR comprises an eighth transistor having a gate terminal coupled to a drain of the second transistor, wherein the eighth transistor has a source terminal coupled to a gate of the third transistor, and wherein the eighth transistor has a drain terminal coupled to a gate terminal of the second transistor.

Figure 2:
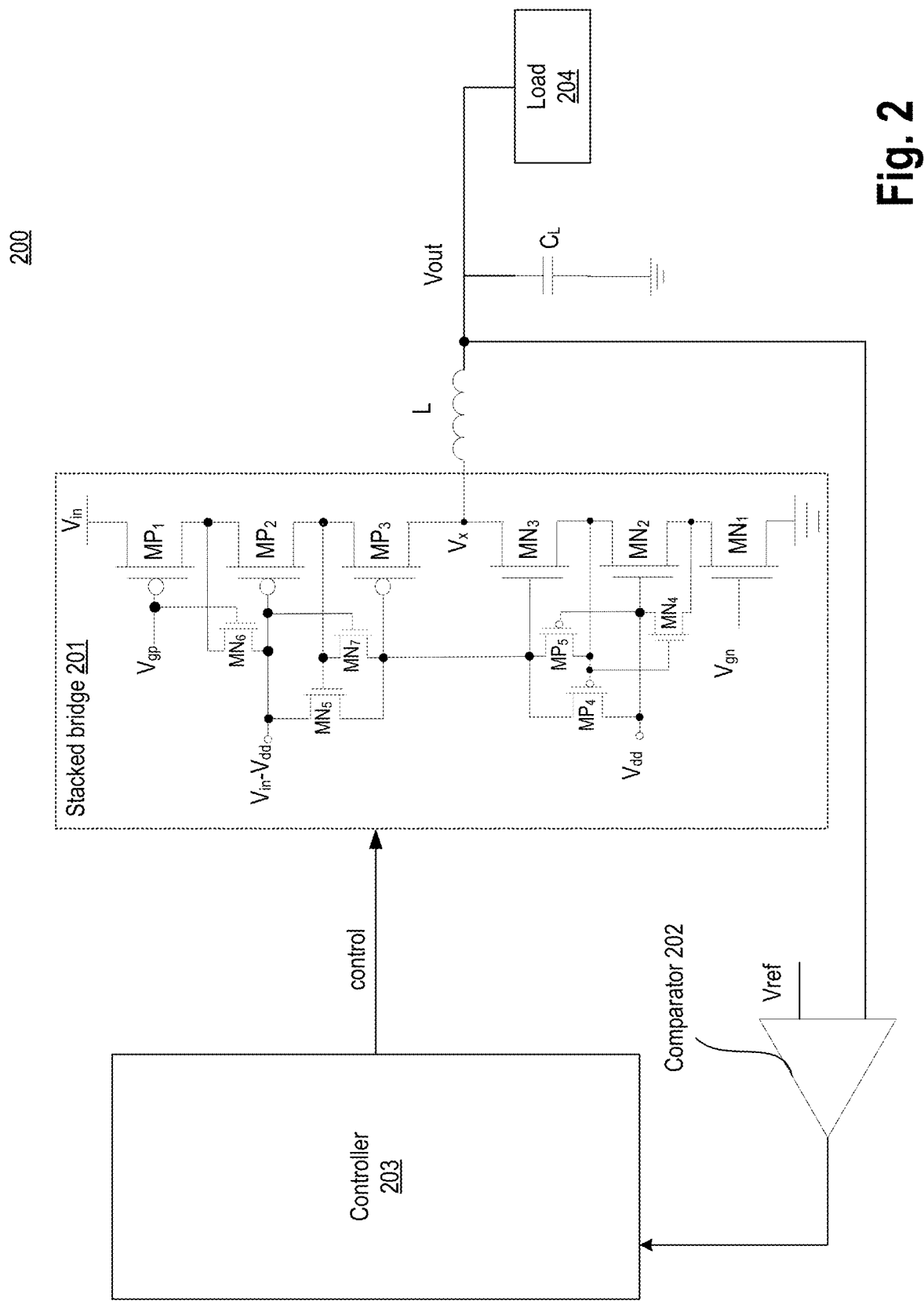
FIG. 2 illustrates a voltage regulator comprising a three-stack power stage, in accordance with some embodiments.

FIG. 2 illustrates VR 200 comprising a three-stack power stage, in accordance with some embodiments. While various embodiments illustrate a three-stack power stage or bridge, the embodiments can be extended to more than three transistors in stack for high-side and/or low-side of a VR.

In some embodiments, VR 200 includes stacked bridge 201, comparator 202, controller 203, inductor L, and capacitor CL coupled to load 204. Inductor L is coupled to the switching node Vx and output node Vout, where the output node Vout is coupled to load 204. Here, load 204 can be any suitable load such as an entire SoC (e.g., SoC of FIG. 16), a processor system 101, processor chiplet 103, processor core 106, etc. VR 200 is a simplified depiction of a voltage regulator. Other components such as non-linear controller (NLC) to mitigate voltage droops on the output node Vout, current sensors to sense current through stacked bridge 201, wave modulator (e.g., pulse width modulated (PWM)) wave generator), etc. are not shown but may be part of VR 200. In some embodiments, comparator 202 compares the voltage on output node Vout with a reference voltage Vref and generates an output for controller 203. Comparator 202 can be a clocked comparator or any other suitable comparator. Here, node names and signal names are interchangeably used. For example, Vout may refer to node Vout or output voltage depending on the context of the sentence.

The output of comparator 202 is used by controller 203 to determine the ON and OFF durations for the high-side and low-side sections or switches of stacked bridge 201. The output of controller 203 is illustrated as a "control". The control represents one or more signals used to regulate the ON and OFF durations of the high-side and low-side sections or switches of stacked bridge 201.

In some embodiments, stacked bridge 201 comprises a high-side section (or simply high-side) or switch having p-type transistors MP1, MP2, and MP3, and a low-side section or switch (or simply low-side) comprising n-type transistors MN1, MN2, and MN3 coupled in series as shown. In some embodiments, the gate of MP1 is controlled by Vgp while the gate of MN1 is controlled by Vgn. MN1 and MP1 are bridge switches. In some embodiments, Vgp and Vgn are generated by controller 203 and determine the ON and OFF durations of the high-side and low-side stacked switches. In some embodiments, stacked bridge 201 further comprises n-type transistors MN4, MN5, MN6, and MN7 coupled as shown.

In some embodiments, stacked bridge 201 comprises p-type transistors MP4 and MP5 coupled as shown. In some embodiments, transistors MN6 and MN7 are Vds balance transistors. In some embodiments, transistors MN5 and MP4 are "On" transistors. Transistors MP2 and MN2 are coupled to mid-rails Vin-Vdd and Vdd respectively, where Vin is the high input power supply (e.g., greater than 3 V) and Vdd is another supply less than Vin (e.g., less than half of Vin).

Here, Vdd is a separate nominal supply generated from Vin by the LDO. In some examples, Vdd is mid-rail of Vin and is =0.9V i.e.; the nominal voltage of the thin-oxide transistor to turn it ON. In some embodiments, the Vds balance switches or transistors MN6 and MN7 ensure voltage balance in steady state. These Vds balance switches MN6 and MN7 have their respective gate terminals coupled to the gates of transistors MP1 and MP2, respectively. The source and drain terminals of transistor MN6 is coupled to drain of transistor MP1 and gate of transistor MP2. The source and drain terminals of MN7 are coupled to gates terminals of MP3 and MN3, and drain terminal of MP2. The gate of transistor MN5 is coupled to the drain of transistor MP3. The source and drain terminals of MN5 are coupled to the gate of MP2 and the gate of MP3. In some embodiments, the gate of MP4 is coupled to the source of MN3, while the source and drains of MP3 are coupled to the gate of MN3 and gate of MN2. In some embodiments, the gate of MN4 is coupled to the gate of MP4, while the source and drain terminals of MN4 are coupled to the drain of MN1 and drain of MN2.

Figure 3:
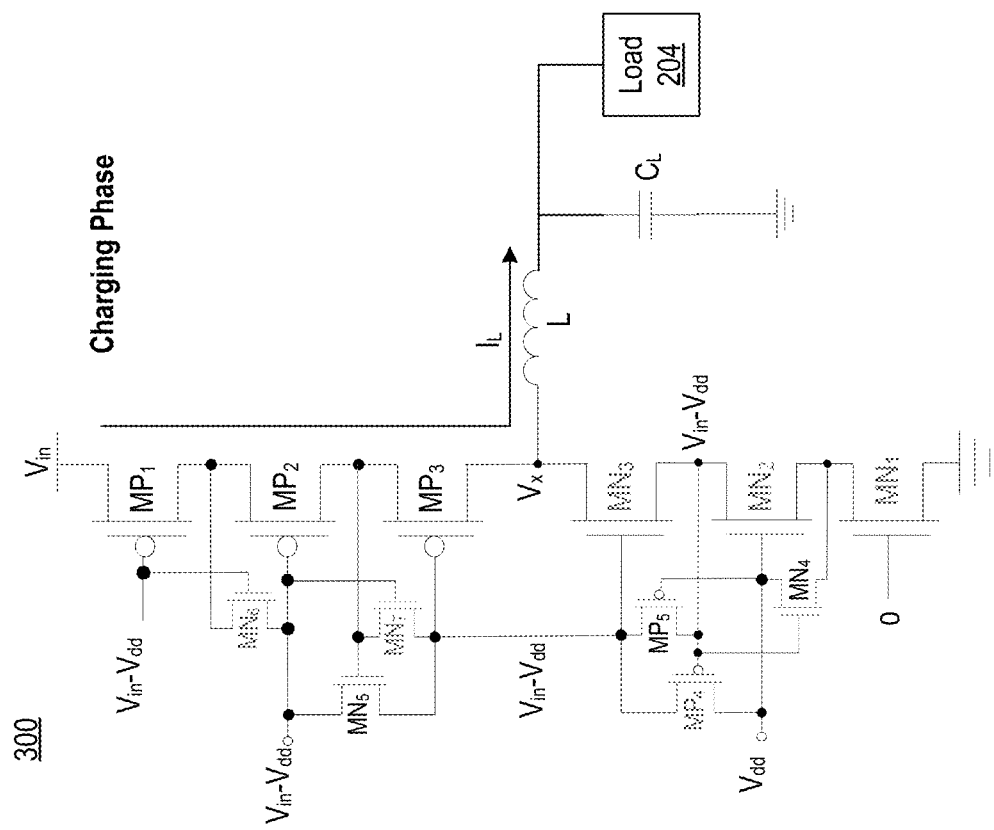
FIG. 3 illustrate a bridge comprising a three-stack power stage during charging phase, in accordance with some embodiments.
Figure 4:
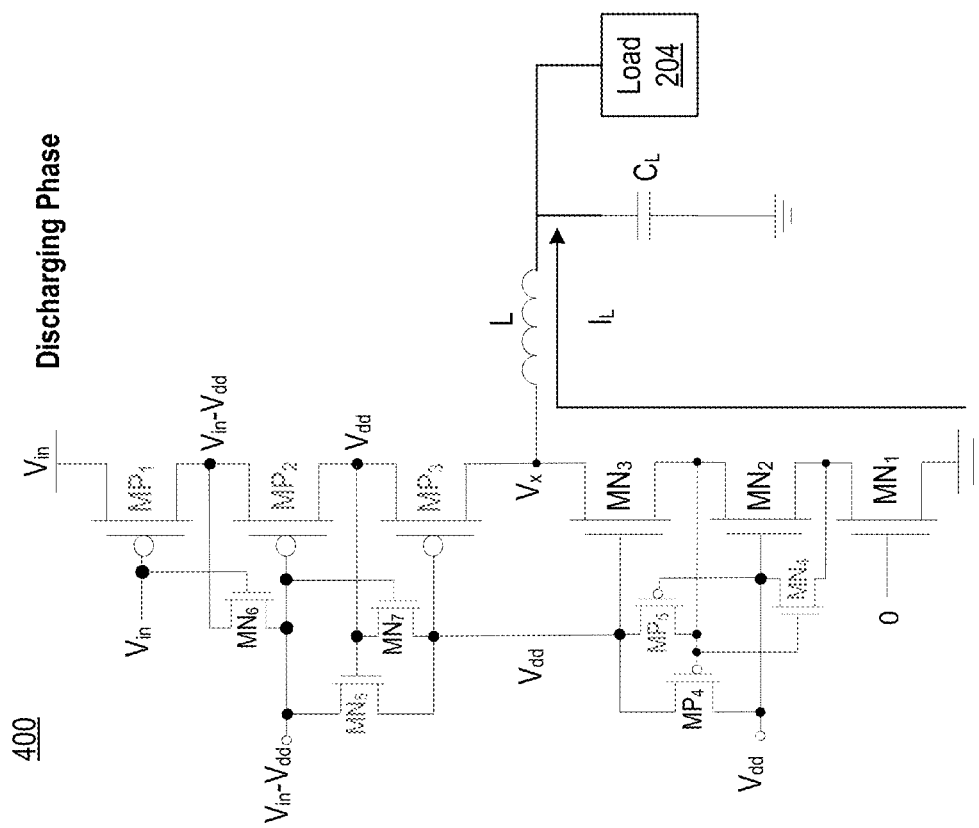
FIG. 4 illustrates a bridge comprising a three-stack power stage during discharging phase, in accordance with some embodiments.

FIG. 3 illustrate bridge 300 comprising three-stack power stage 201 during charging phase, while FIG. 4 illustrates bridge 400 comprising three-stack power stage 201 during discharging phase, in accordance with some embodiments. The light shaded transistor labels indicate devices or transistors that are turned off during the charging and/or discharging phases, while the dark shaded transistor labels indicate devices or transistors that are turned on during the charging and/or discharging phases. In some embodiments, the "turn ON transistors" MN5 and MP4 are sized as (W/20), where W is the size (width) of power train switches MP1 and MN3. The "turn ON transistors" MN5 and MP4 are used to drive the middle switches MP2 and MN2, eliminating the need for extra drivers that would be otherwise result in timing violation, high driver losses and design complexity. In some embodiments, the "VDS balance transistors" MN6 and MN7 ensure that $|V_{GS}|$ is "0" when power switch turns OFF and ensure that the internal nodes of the power train transistors MP1 and MN1 have defined values that guarantee the Vds balance across all switches.

Figure 5:
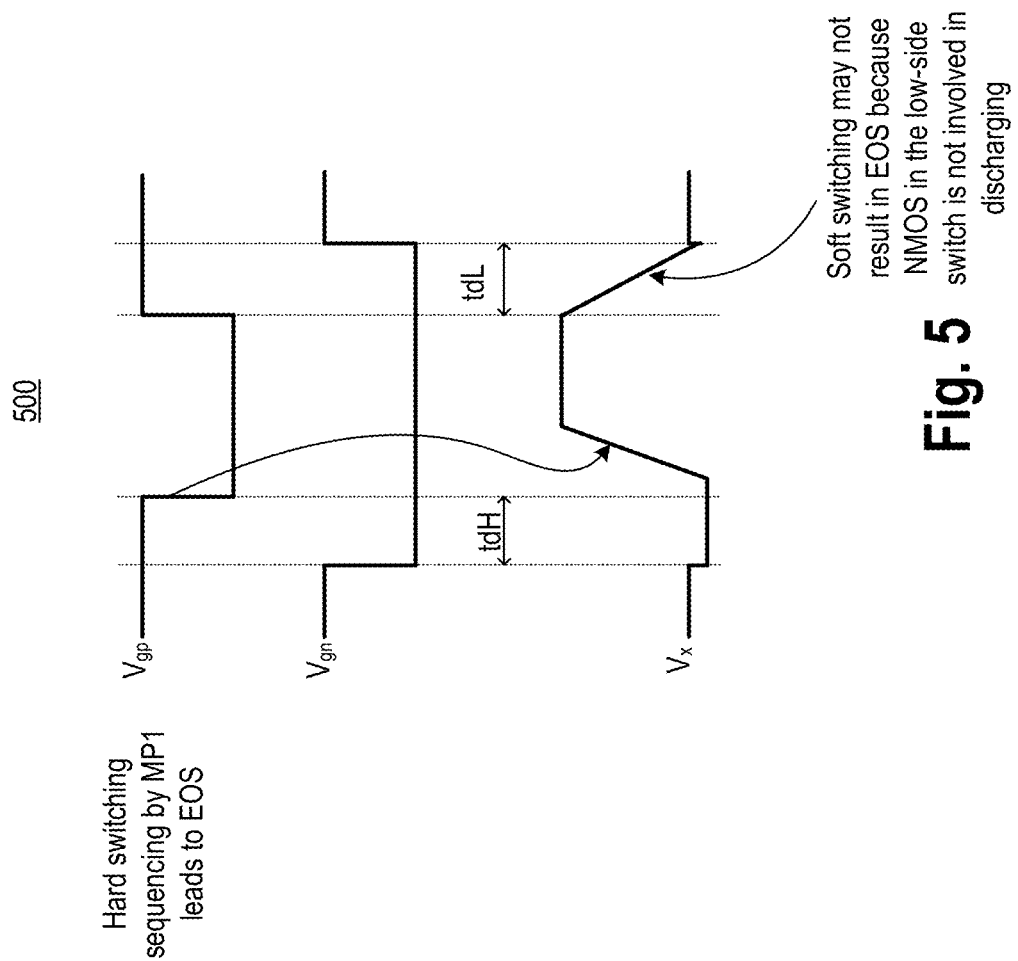
FIG. 5 illustrates some possible challenges with the three-stack power stage.

FIG. 5 illustrates plot 500 showing some possible challenges with the three-stack power stage. Plot 500 shows voltage on switching node Vx during one switching cycle. Here, Vgp is the signal that controls MP1 switch while Vgn is the signal that controls MN1 switch. Here, the term hard switching means that the switch turns ON when Vds is maximum, so losses are high, and aging is worse which makes electrical overstress (EOS) to matter the most. Here, the term soft switching means that the switch turns ON when Vds substantially equals to zero so losses are substantially 0 (i.e., ZVS), resulting in minimum EOS. In buck converter, during the inductor charging phase, the high-side PMOS turns ON the multi-stack sequentially to bring Vds of each transistor to zero. The delay associated with this results in EOS. On the other hand, during the inductor discharging phase (in the case of soft switching), the inductor current discharge the low-side nodes to 0 (or substantially zero) before the low-side turns ON resulting in no EOS.

Figures 6A, 6B:
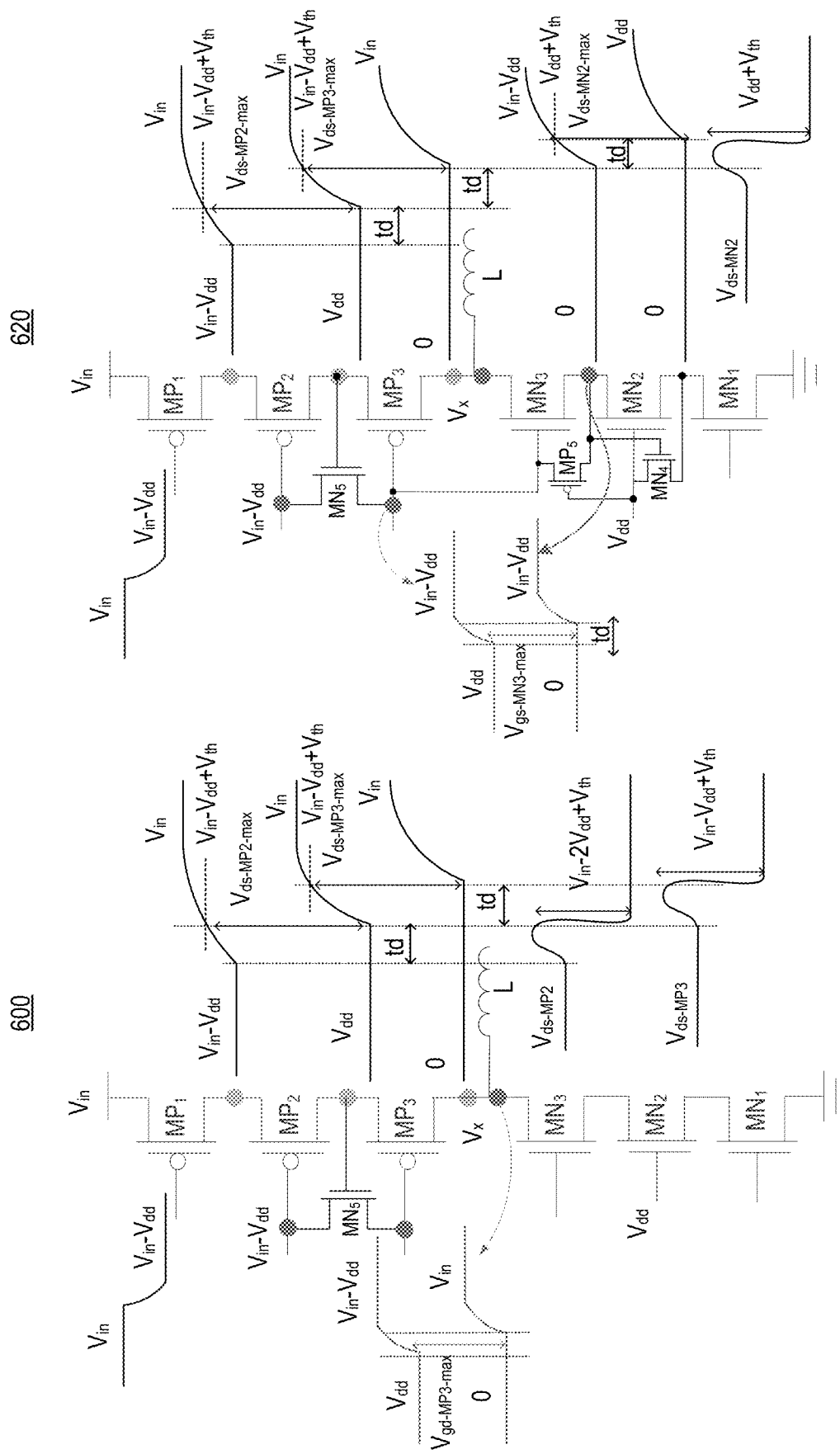
FIGS. 6A-B illustrate the three-stack power stage with possible high-side EOS violation during low-to-high transition, with possible low-side EOS violation during low-to-high transition.
Figure 8A:
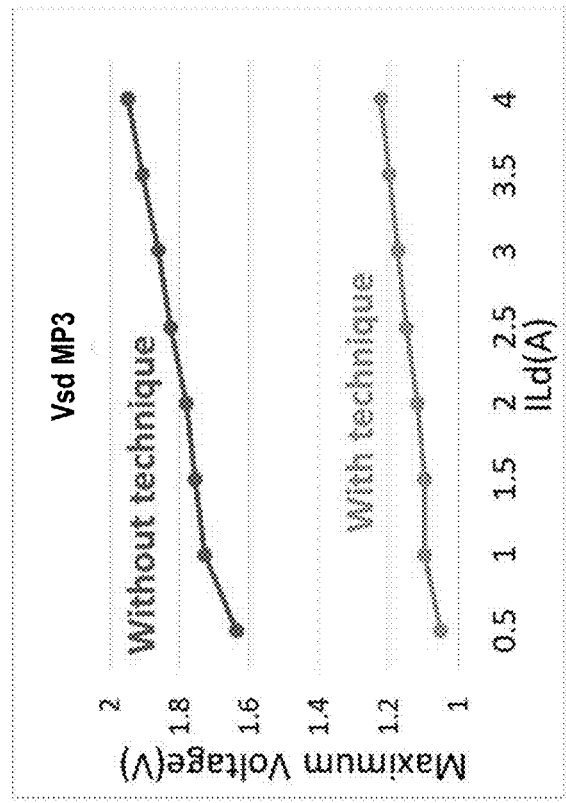
Figure 8B:
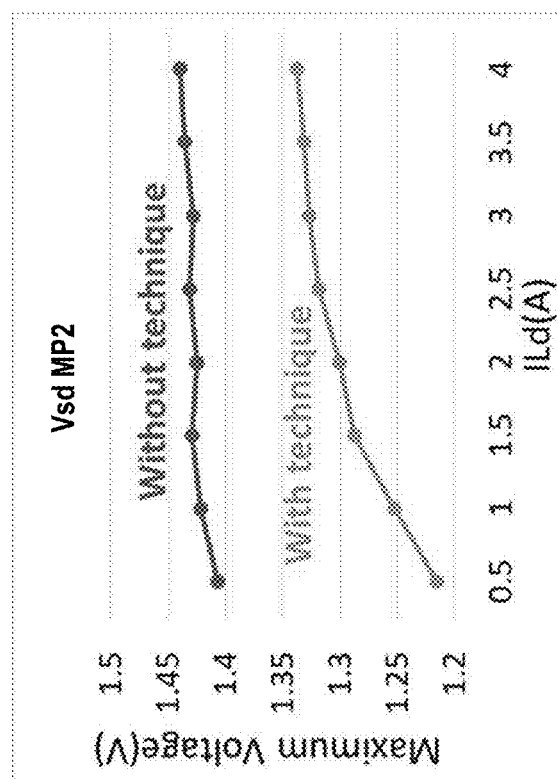

FIGS. 6A-B illustrate the three-stack power stage 201 with possible high-side EOS violation during low-to-high transition as shown by state 600 of three-stack power stage 201, with possible low-side EOS violation during low-to-high transition as shown by state 620 of three-stack power stage 201. State 600 shows the voltage of the top PMOS switch MP1 gate voltage, $V_{gp}$, bottom NMOS switch MN1 gate voltage, $V_{gn}$, and the switching node, $V_x$, respectively. During the low-to-high transition, the hard switching of $V_x$ node by MP1 may cause EOS problem, while during the high-to-low transition, the $V_x$ node is soft-switched causing no problem at this transition. States 600 and 620 illustrate the root cause of EOS problem in stacked buck bridge 201 during the low-to-high transition.

State 600 shows the internal nodes waveforms of PMOS switches MP1, MP2, and MP3. During low-to-high transition, the stacked high side PMOS switches MP1, MP2, and MP3 turn ON sequentially and not at the same time. For instance, $V_{gp}$ goes low and MP1 turns ON but MP2 will not turn ON until the drain voltage of MP1 is higher than the gate voltage of MP2 by threshold $V_{th}$. This delay makes $V_{ds-MP2}$ exceeds the maximum voltage rating until transistor MP2 completely turns ON. Same applies for transistors MP3, where transistor MP3 will not turn ON until the drain voltage of transistor MP2 is higher than the gate voltage of MP3 by Vth. Since transistor MP3 charges its drain from lower voltage than MP2, transistor MP3 suffers from higher EOS than transistor MP2 (i.e., $V_{ds-MP3-max} \gg V_{ds-MP2-max}$) Transistor MP3 charges its drain from 0 to Vin while transistor MP2 charges its drain from Vdd to Vin so transistor MP3 charges its drain from lower voltage than transistor MP2 (e.g., zero vs Vdd as shown in FIG. 7A) so transistor MP3 suffers more EOS violation and worse aging impact.

The same problem makes $V_{gd-MP3}$ exceeds the maximum voltage rating. State 620 shows the internal nodes waveforms of PMOS switches MP1, MP2, and MP3. During the low-to-high transition, NMOS internal nodes MN1, MN2, and MN3 also charge sequentially making $V_{ds-MN2}$ and $V_{gs-MN3}$ exceed the maximum voltage rating. The EOS problems mentioned herein may not occur during the high-to-low transition because of the soft switching/ZVS where NMOS stack (comprising MN1, MN2, and MN3) turns ON only when "$V_x$=0".

FIGS. 7A-B illustrate three-stack power stage 700 with EOS mitigation, and associated timing diagram 720, respectively, in accordance with some embodiments. In some embodiments, a small p-type device MPeos is added at the low-side section to turn on and pre-charge $V_x$ node to Vdd−$V_{th}$. As such, EOS is reduced on all switches and losses of the high-side section are reduced during low-to-high transition which in turn improves efficiency as well. Here, small refers to about $1/10^{th}$ the size of high-side or low size transistors. In one example, when the sizes of transistors MP1, MP2, MP3, MN1, MN2, and MN2 are 1× then the size of MPeos is 0.1×.

Three-stack power stage 700 enforces similar behavior to soft switching in the high-to-low transition to mitigate EOS. This is done by pre-charging $V_x$ node to high voltage before the turn ON of the high side PMOS. In some embodiments, the small PMOS switch MPeos is positioned between the generated mid rail Vdd and the internal node $n_{12}$. As shown in timing diagram 720, during the low-to-high transition, MN1 turns OFF, and after the deadtime, the small MPeos switch turns ON instead of the PMOS side (MP1) for a short duration (e.g., approximately 50 ps) to pre-charge the $V_x$ node to "Vdd−Vth" through transistors MN2 and MN3. Then, the high-side PMOS switches (MP1, MP2 and MP3) turn ON when "Vx=Vdd−Vth", hence, reducing the EOS on all switches that were shown FIGS. 6A-B. In some embodiments, transistors MN4, MN5, MN6, and MN7 are also part of three-stack power stage 700, but not shown for simplicity sake. In some embodiments, transistors MP4, MP5, and MP6 (in addition to transistors MN4, MN5, MN6, and MN7) are also part of three-stack power stage 700, but not shown for simplicity sake.

FIGS. 8A-G illustrate a set of plots 800, 820, 830, 840, 850, 860, and 870, respectively, showing EOS mitigation using three-stack power stage, in accordance with some embodiments. The set of plots compares the maximum voltage across power switches of a typical three-stack bridge driver with those of three-stack power stage 700.

Figure 9:
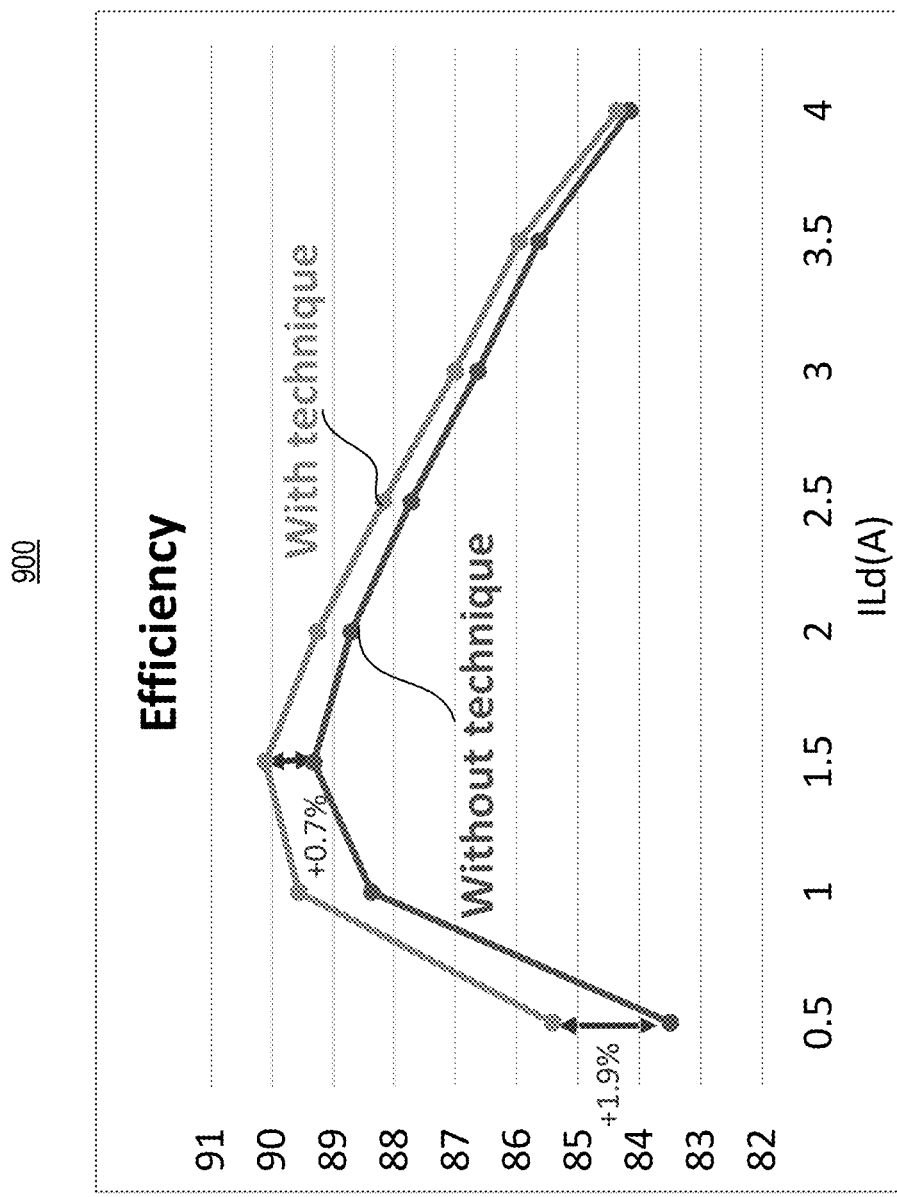
FIG. 9 illustrates a plot showing zero voltage switching (ZVS) and efficiency improvement with three-stack power stage, in accordance with some embodiments.

FIG. 9 illustrates plot 900 showing zero voltage switching (ZVS) and efficiency improvement with three-stack power stage, in accordance with some embodiments. The efficient of a typical three-stack bridge driver is compared with the efficiency of three-stack power stage 700.

FIGS. 10A-B illustrate a set of plots 1000 and 1020, respectively, showing improvement in EMI mitigation and power supply ringing using three-stack power stage, in accordance with some embodiments. Plot 1000 shows converter input current with and without the EOS mitigation apparatus of various embodiments. Plot 1020 shows supply ringing after adding package inductor with and without the EOS mitigation apparatus of various embodiments.

Figure 11:
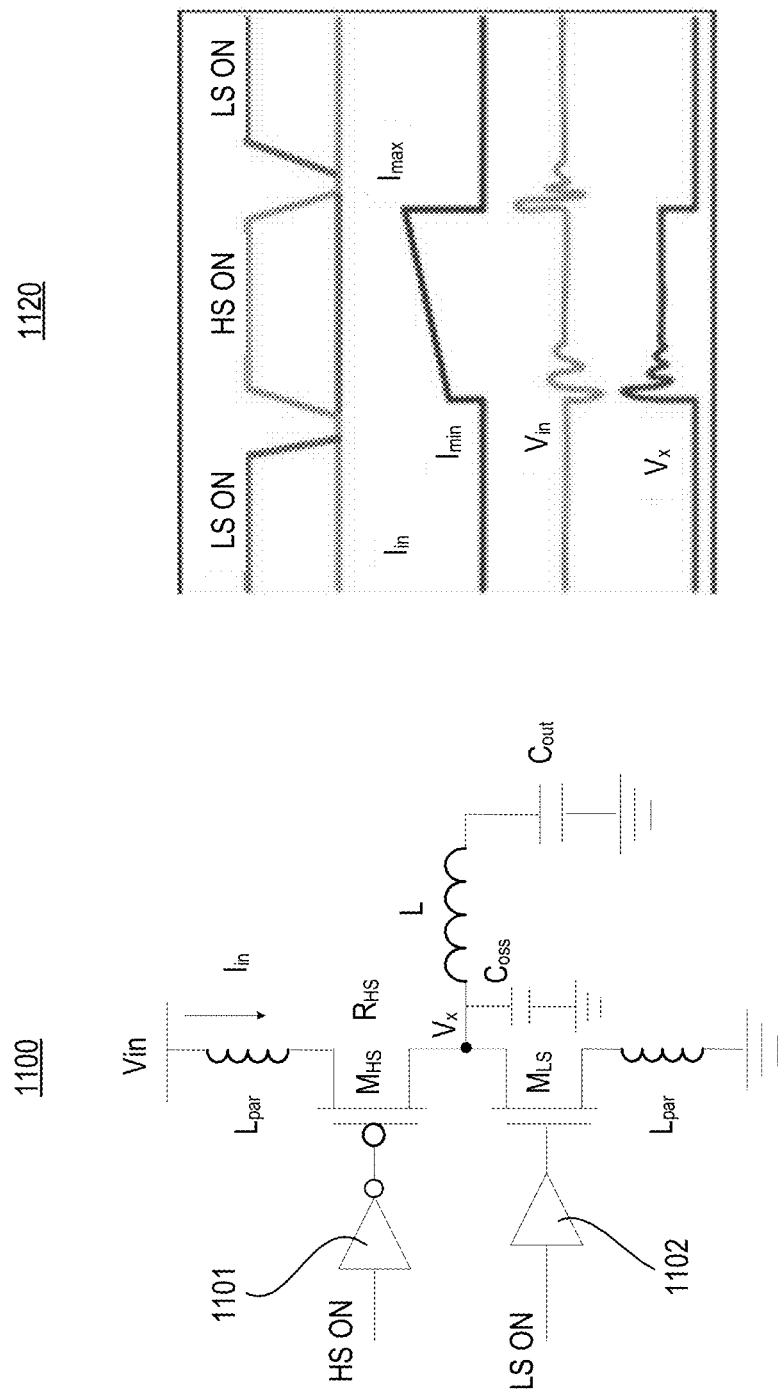
FIG. 11 illustrates a voltage regulator bridge and associated timing diagram showing ringing.

FIG. 11 illustrates VR bridge 1100 and associated timing diagram 1120 showing ringing. VR bridge 1100 illustrates high-side switch MHS, low-side switch MLS, inductor L, output capacitor Cout, high-side driver 1101, low-side driver 1102, input power supply rail Vin, parasitic inductors Lpar, parasitic capacitance Coss on switching node Vx. As discussed herein, bringing in higher input supply voltage Vin to a VR minimizes the input current which highly reduces the power distribution losses in higher current application like servers and increases the end-to-end efficiency. However, parasitic inductor on board, in package, and/or on die (Lpar) are excited by fast switching transients during low-to-high $V_x$ node transition. Current step response at the inductor switching node, $V_x$, during inductor charging phase in an RLC (resistor-inductor-capacitor) loop generates significant ringing at the $V_x$ node as shown by timing diagram 1120. The ringing results in device electrical overstress (EOS) and degraded device reliability and maximum Vin limit. The ringing also increases high frequency EMI and increases core losses and efficiency degradation. The ringing on Vx increases AC losses at high frequency due to skin effect and efficiency degradation.

One way to mitigate ringing is to increase the damping factor of the RLC. Other methods to improve relatability include reducing the total parasitic inductor, adding RC snubbers between the Vin node and the $V_x$ node, adding huge decoupling capacitor on the input source or using slew rate control, and lowering the input voltage, Vin, of VR to enhance VR reliability.

However, lowering the power stage Vin may not make full utilization of the high voltage blocking capability of transistors. Techniques to increase the damping factor, $$\xi = \frac{Rds}{2}\sqrt{\frac{Lpar}{Coss}}$$

include reducing the total parasitic inductor, and such techniques are expensive and constraint by packaging technology. RC snubbers results in increase in area and efficiency degradation while the huge decoupling capacitors used for ringing mitigation increase area. Also, the slew rate control results in overlap losses, efficiency degradation, hence, tradeoff between EMI/EOS and efficiency. The slew rate control turns on the large high-side switch of the VR slowly (increasing $T_f$) by controlling the gate drive strength, hence result in high overlap losses (Pov=$0.5V_{in}(T_r+T_f)FswI_{Ld}$) and efficiency degradation, where $T_r$ is rise time of the voltage on the gate of the high-side switch, $T_f$ is the fall time of the voltage on the gate of the high-side switch, Fsw is the switching frequency of the signal on node Vx, and $I_{Ld}$ is the current through the inductor.

Figure 12:
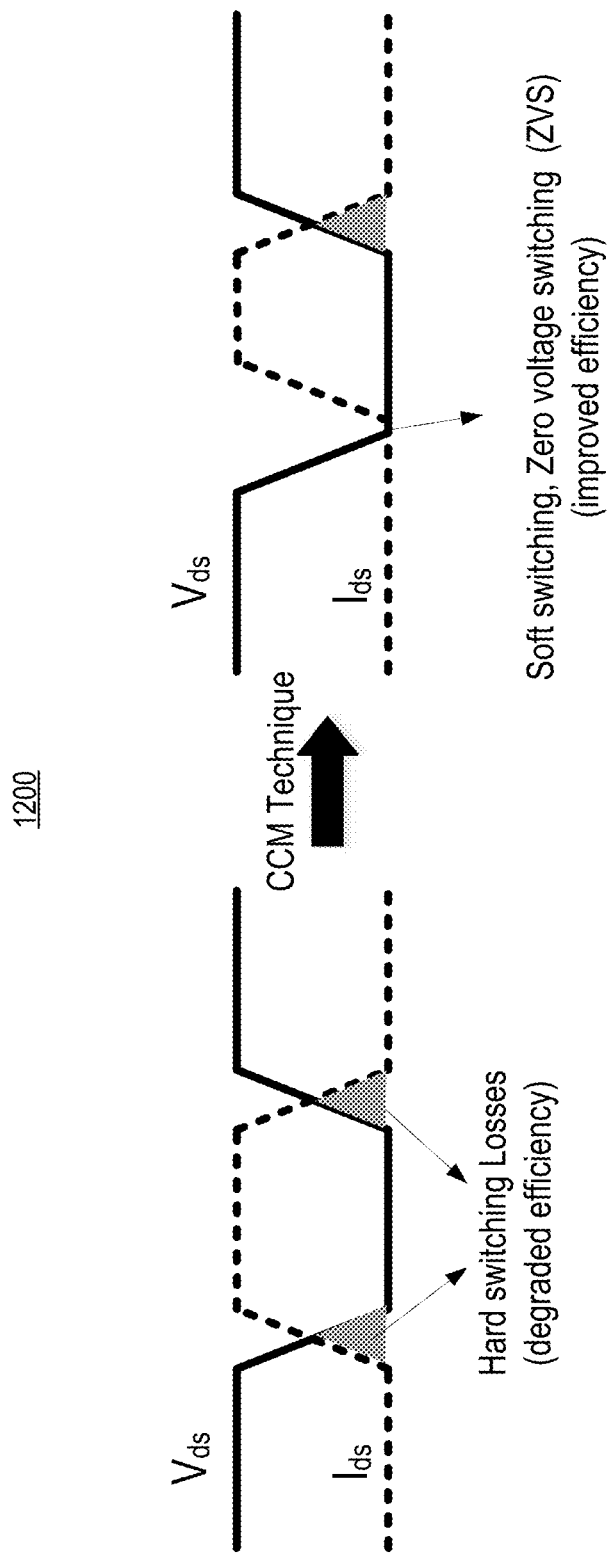
FIG. 12 illustrates a set of plots showing controlled conductance modulation to enable soft-switching at zero voltage for a large-sized high-side power switch, in accordance with some embodiments.

FIG. 12 illustrates a set of plots 1200 showing controlled conductance modulation to enable soft-switching at zero voltage for a large-sized high-side power switch, in accordance with some embodiments. Some embodiments illustrate an apparatus that performs controlled conductance modulation (CCM) on the high-side (HS) top switch MHS during the inductor charging phase (i.e., during turn-on of HS) to mitigate the ringing without controlling the gate drive strength, hence, there is no additional overlap losses as in the traditional slew rate control.

Figures 13A, 13B:
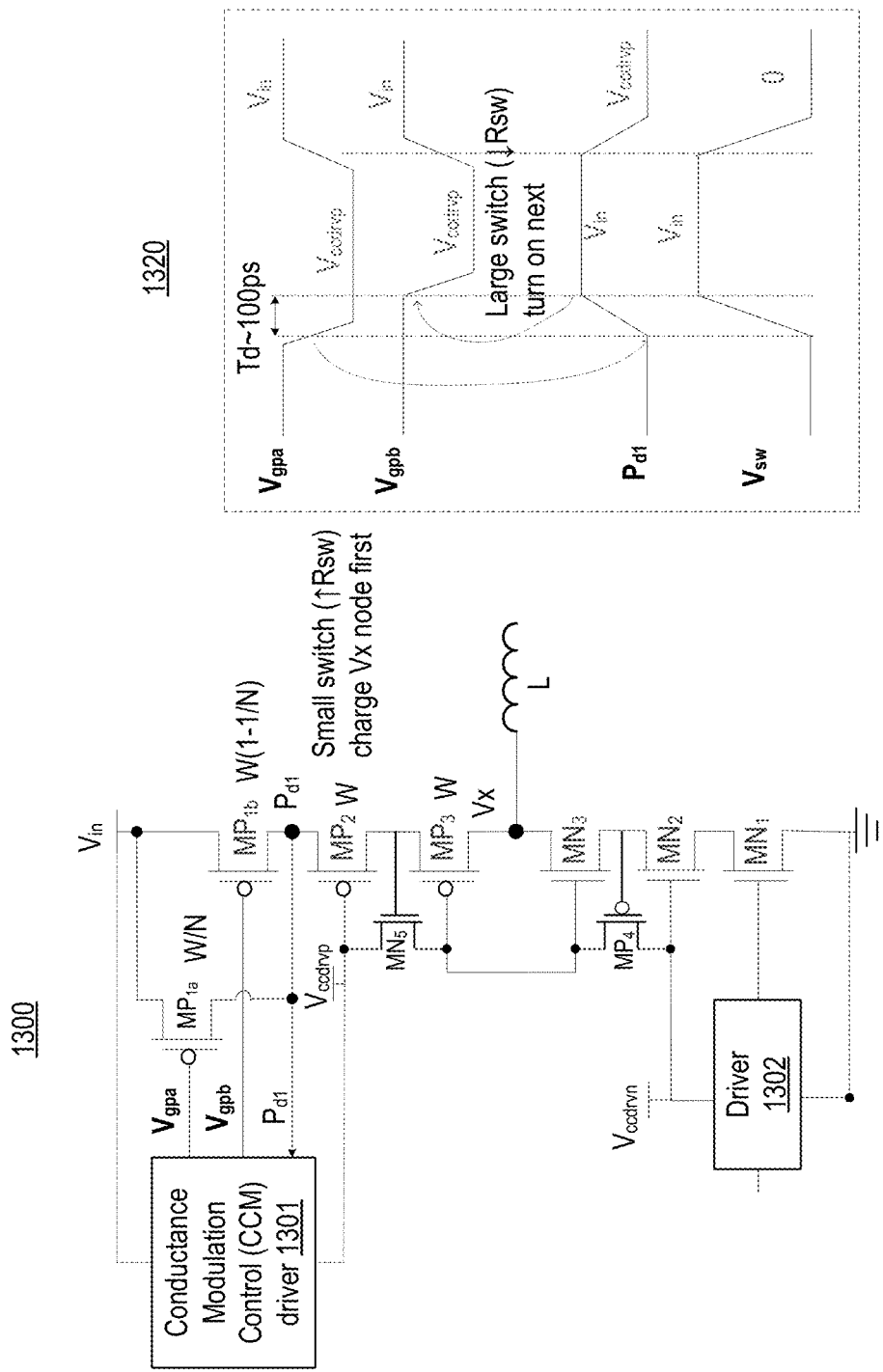
FIGS. 13A-B illustrate a 3-stack high-voltage power train, and associated timing diagram, in accordance with some embodiments.

FIGS. 13A-B illustrate a 3-stack high-voltage power train 1300, and associated timing diagram 1320, in accordance with some embodiments. In some embodiments, transistors discussed with reference to FIGS. 7A-B, and FIGS. 3-4 can also be included in 3-stack high-voltage power train 1300.

In some embodiments, the top power switch MP1 of the power train split into small and large power switches—MP1*a* and MP1*b*, where MP1*b* is larger than MP1*a*. In various embodiments, MP1*a* is turned on first before turning on the larger switch MP1*b*. As such node Pd1 is pre-charged to provide zero voltage switching behavior for larger switch MP1*b*.

In some embodiments, CCM driver 1301 is used to drive MP1*a* and MP1*b* in a way to mitigate ringing on node Vx. In some embodiments, a regular driver or a soft switching driver 1302 is used to provide the low-side switch MN1.

In some embodiments, the small power switch MP1*a* turns ON first for 3 reasons: 1), making the ON-resistance small during transition, hence increasing the damping facto $$\xi = \frac{Rds}{2}\sqrt{\frac{Ltot}{Coss}},$$

and result in ringing mitigation (i.e.; EMI and EOS mitigation); 2) pre-charging the inductor switching node, Vx, by small-sized power switch before the turn ON of the large power switch, to perform soft switching at zero voltage (ZVS) across the large power switch. 3) improving the efficiency (Ploss α size of transistor) and eliminate any efficiency penalty from ringing mitigation, unlike the conventional ringing mitigation techniques. The detected low-to-high transition at Vx node triggers the turn-ON of the large power switch MP1*b* to enable the converter small Ron operation.

During the inductor charging phase (low-to-high transition Vx: 0→Vin), the CCM driver 1301 turns ON the small power switch MP1*a* first during transition (to have large Rds and damping factor to mitigate ringing on the Vin and Vx node). The small switch MP1*a* enables charging the power train internal node, Pd1 from "Vin-Vov" to "Yin" and the inductor switching node, Vx from "0" to "Yin", where Vov is the overdrive voltage.

In some embodiments, the rising edge of Vx is detected by CCM driver 1301 by sensing Pd1, and accordingly CCM driver 1301 turns ON the large power switch MP1*b* when Pd1=Vin−Vov+Vth i.e., soft switch the large power switch MP1*b* at zero voltage (ZVS). Unlike other traditional ringing mitigation techniques, CCM driver 1301 performs ringing mitigation without efficiency degradation. While the embodiments are illustrated with reference to a single-phase voltage regulator, the concepts can be extended to a multi-phase voltage regulator.

Figure 14:
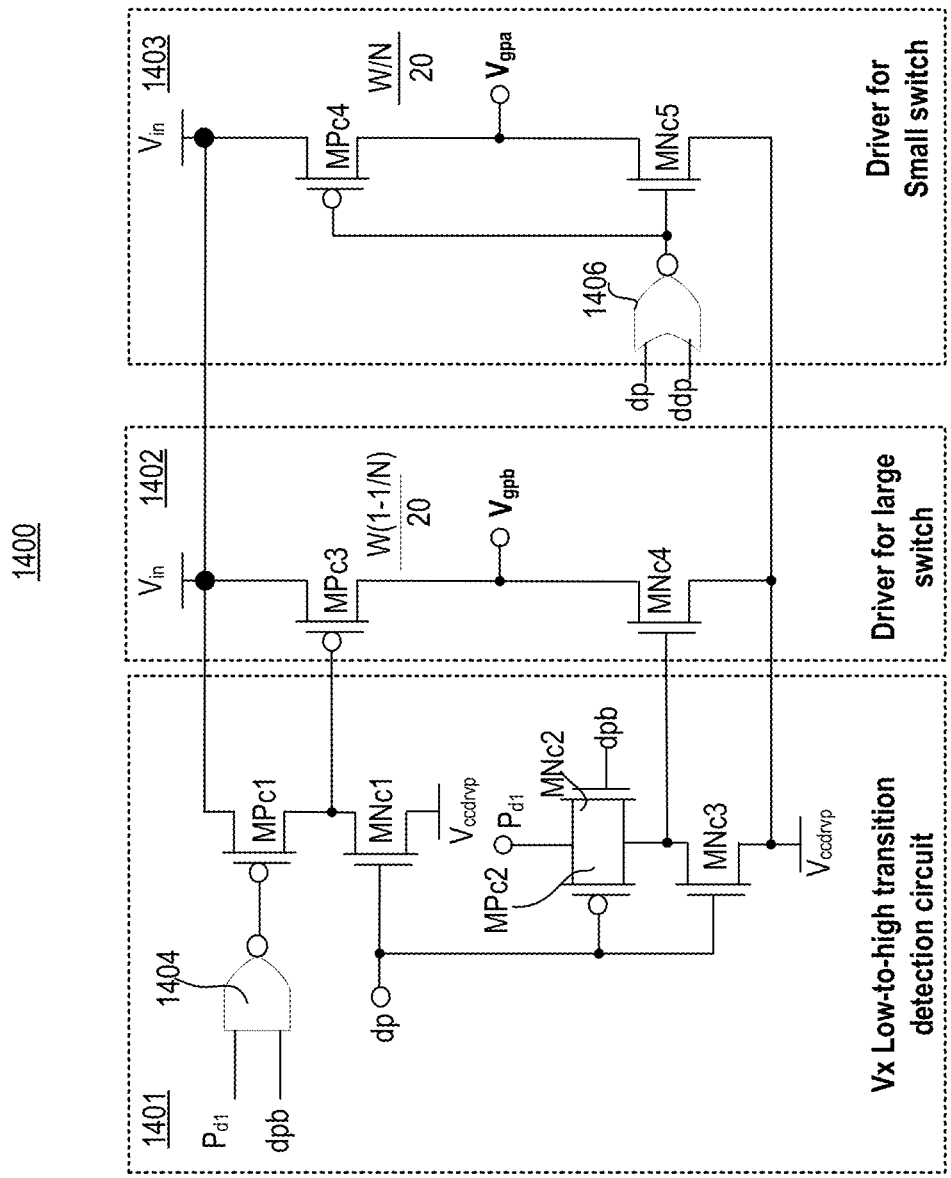
FIG. 14 illustrates a controlled conduction modulation driver, in accordance with some embodiments.

FIG. 14 illustrates a controlled conduction modulation (CCM) driver 1400 (e.g., 1301), in accordance with some embodiments. In some embodiments, CCM driver 1400 comprises detection circuit 1401, driver 1402 to drive large switch MP1*b*, and driver 1403 to drive small switch MP1*a*. In some embodiments, detection circuit 1401 detects Vx low-to-high transition, and comprises NAND gate 1404, p-type transistor MPc1, n-type transistor MNc1, pass-gate comprising p-type transistor MPc2 and n-type transistor MNc2, and n-type transistor MNc3 coupled as shown. The gate of transistors MNc1, MPc2, MNc2, and MNc3 are controlled by dp. Note, dpb is the inverse or complementary of dp. Here, "dp" is the high-side gate drive voltage. The source of MNc3 is coupled to Vccdrvp. The source of MNc1 is coupled to Vccdrvp.

With reference to FIG. 13A and FIG. 14, Vccdrvp=Vin-Vdd=Vin-Vov (e.g., high-side driver voltage) and Vccdrvn=Vdd=Vov (e.g., low-side driver voltage). Both Vccdrvp and Vccdrvn are generated from a battery voltage, Vin, from LDO or midrail generation Vov=Vdd=0.9 (e.g., maximum voltage of PMOS and NMOS to turn ON).

Driver 1402 comprises push-pull circuitry comprising p-type transistor MPc3 and n-type transistor MNc4 coupled as shown. Driver 1403 comprises NOR gate 1406, p-type transistor MPc4 and n-type transistor MNc5 coupled as shown. The transistor size of MPc4 is smaller than transistor size of MPc3 by a ratio similar to a ratio of sizes between large p-type switch MP1*b* and smaller p-type switch MP1*b*. CCM driver 1400 can be used to modulate conductance of any high-side switch, and not just for a high-side section of three-stack high-voltage power train 1300.

Figures 15A, 15B:
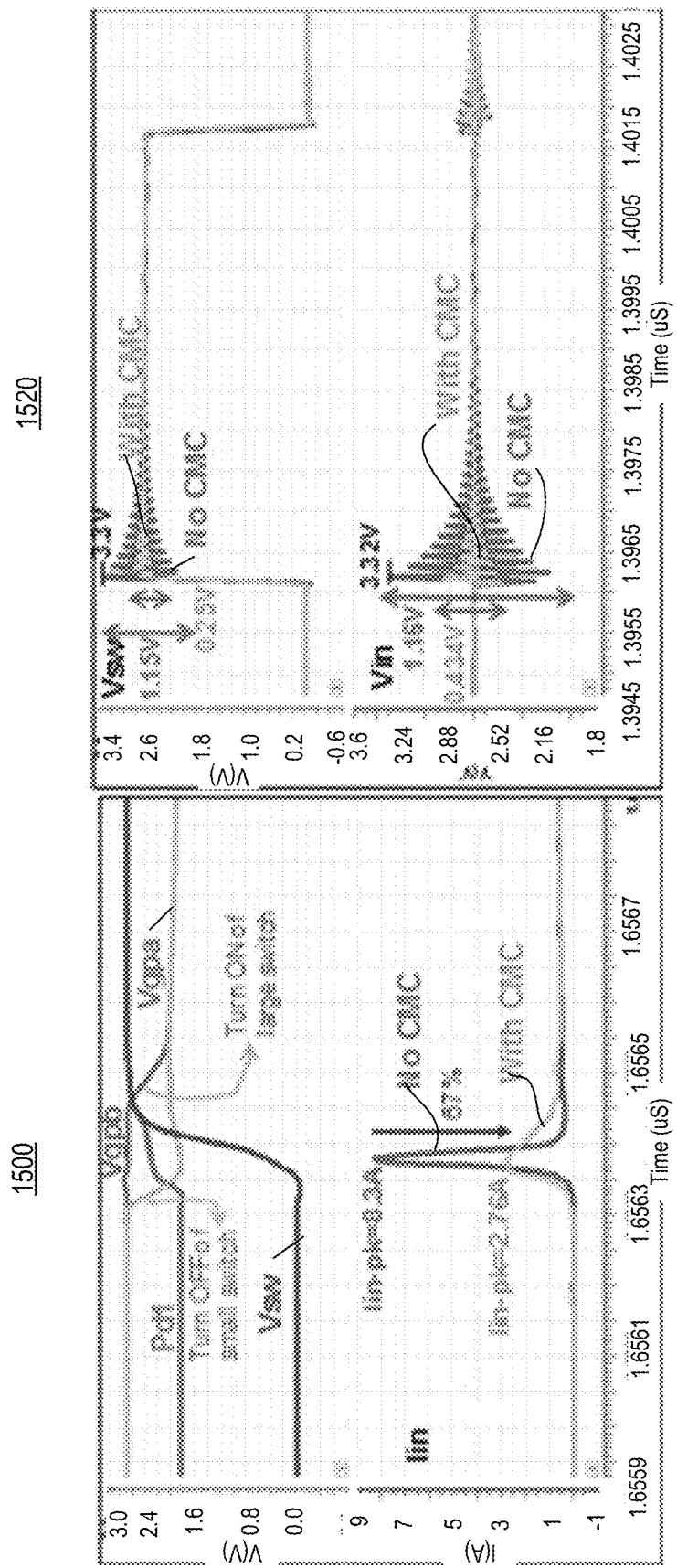
FIGS. 15A-B illustrate a set of plots showing ringing mitigation with the controlled conduction modulation driver, in accordance with some embodiments.

FIGS. 15A-B illustrate a set of plots 1500 and 1520 showing ringing mitigation with the controlled conduction modulation driver, in accordance with some embodiments. Plot 1500 shows the battery voltage input current during the low-to-high side transition with and without the CCM technique at $I_{Ld}$=1.5A. The CCM technique reduces the input peak current, for example by 67%, which translates into ringing mitigation and improvement in EMI. The reduction in the supply and inductor switch node ringing is shown in plot 1520. Peak Vin reduces by, for example 15%, which allows more headroom to build reliable high-voltage VR. The high frequency ringing at Vin and Vx reduces by, for example, 62% and 90%, respectively which translates in EMI friendly converter.

Figure 16:
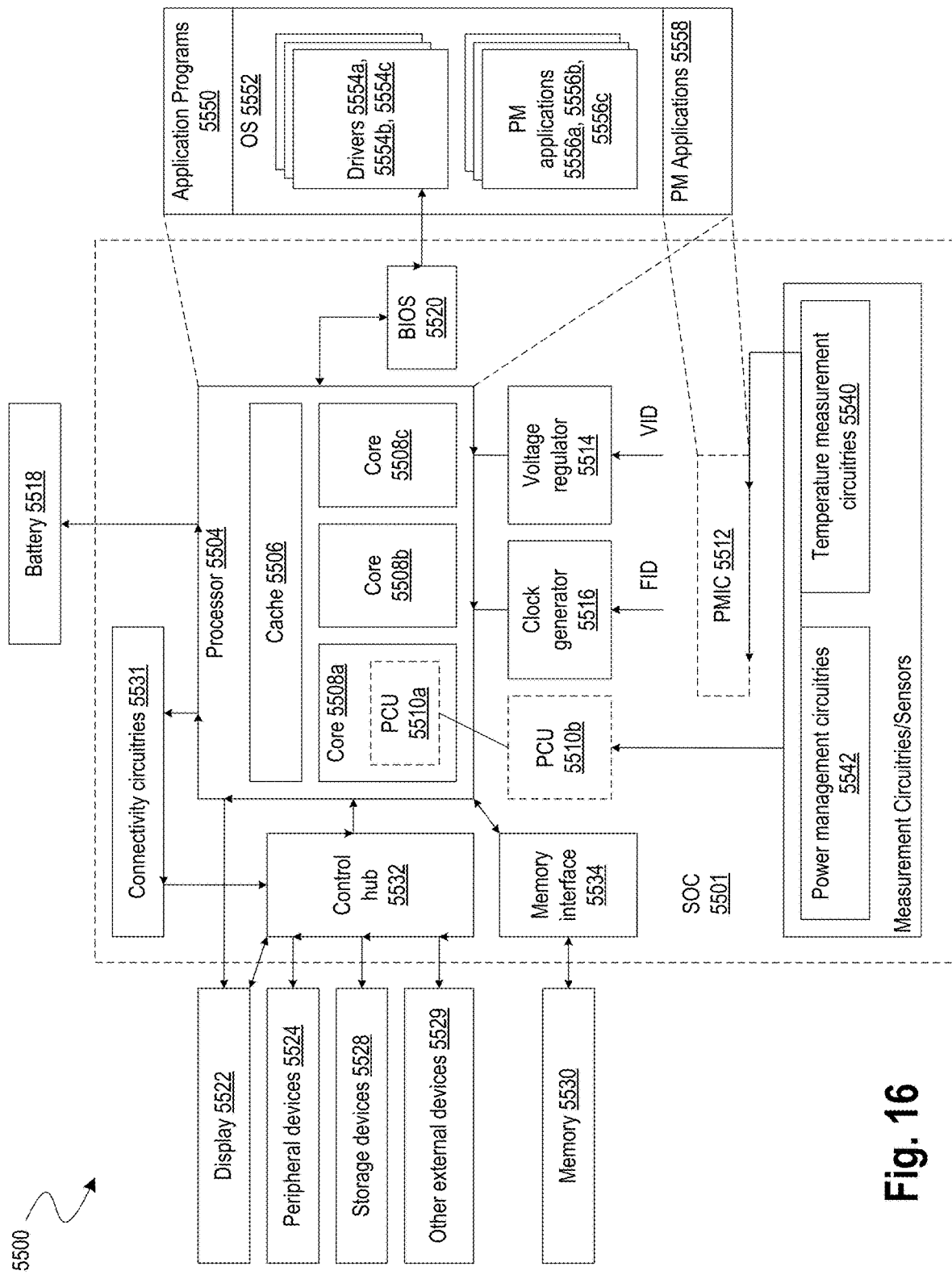
FIG. 16 illustrates a smart device or a computer system or a SoC (System-on-Chip) with a three-stacked bridge or voltage regulator driver, in accordance with some embodiments.

FIG. 16 illustrates a smart device or a computer system or a SoC (System-on-Chip) with a three-stacked bridge or voltage regulator driver, in accordance with some embodiments. It is pointed out that those elements of FIG. 16 having the same reference numbers (or names) as the elements of any other figure may operate or function in any manner similar to that described, but are not limited to such. Any block in this smart device can have the apparatus for dynamically optimizing battery charging voltage.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 16, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508*a*, 5508*b*, 5508*c*. Although merely three cores 5508*a*, 5508*b*, 5508*c* are illustrated in FIG. 16, processor 5504 may include any other appropriate number of processing cores, e.g., tens, or even hundreds of processing cores. Processor cores 5508*a*, 5508*b*, 5508*c* may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508*a*, a second section of cache 5506 dedicated to core 5508*b*, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device

5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, charging circuitry in battery 5518, PMIC 5512, and/or VR 5514 comprises a stacked voltage regulator (VR) that pre-charges inductor switching node to mitigate electrical overstress (EDS). The stacked VR comprises at least three n-type devices (low-side) and three p-type devices (high-side) coupled in series. The three p-type stacked devices are part of a high-side of the VR. Node Vx coupling one of the n-type devices and one of the p-type devices is coupled to an inductor, which is also coupled to a load capacitor. During the inductor charging phase, in the low-to-high transition at node Vx, a small p-type device is added to pre-charge the inductor switching node (Vi) from "0" to "VDD–Vth" through the low-side by connecting a generated mid-rail "Vdd" to the internal node of the n-type stack for a short period (e.g., about 50 ps). A controlled conductance modulation (CCM) scheme on the high-side top switch during the inductor charging phase is used to mitigate the ringing without controlling the gate drive strength.

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556*a*, 5556*b*, 5556*c*. The OS 5552 may also include various drivers 5554*a*, 5554*b*, 5554*c*, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510*b*.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a high-side bridge comprising first transistor, second transistor, and third transistor coupled in series, wherein the first transistor is coupled to an input power supply node, and wherein the second transistor is coupled between the first transistor and the third transistor; a low-side bridge coupled in series with the high-side bridge at a switching node, wherein the low-side bridge comprises fourth, fifth, and sixth transistor coupled in series, wherein the fourth transistor is coupled to a ground supply node, wherein the fifth transistor is coupled between the fourth and sixth transistors; and circuitry to pre-charge the switching node to a high voltage before the first transistor is turned on.

Example 2: The apparatus of example 1, wherein the circuitry comprises a p-type transistor coupled to a gate of the fifth transistor and a drain of the fourth transistor.

Example 3: The apparatus of example 2, wherein the p-type transistor is smaller than the fifth transistor.

Example 4: The apparatus of example 1, wherein the circuitry is to pre-charge the switching node for about 50 ps.

Example 5: The apparatus of example 1, wherein the circuitry is to pre-charge the switching node to a voltage substantially equal to Vdd–Vth through fifth and sixth transistors after the fourth transistor is turned off, where Vth is a threshold voltage of the fourth transistor, and wherein Vdd is lower than a voltage on the input power supply node.

Example 6: The apparatus of claim 1, wherein a voltage on the input power supply node is greater than 3 V.

Example 7: The apparatus of example 1, wherein the high-side bridge comprises a seventh transistor coupled in parallel to the first transistor, wherein the seventh transistor is smaller than the first transistor.

Example 8: The apparatus of example 7, wherein the circuitry is a first circuitry, wherein the apparatus comprises a second circuitry turn on the seventh transistor before the second circuitry turns on the fifth transistor.

Example 9: The apparatus of example 8, wherein the seventh circuitry includes a first driver to drive the first transistor and a second driver to driver the seventh transistor.

Example 10: The apparatus of example 9, wherein the seventh circuitry includes a detector to detect low-to-high transition on the switching node via a voltage on a drain of the first transistor, and to turn on the seventh transistor during the low-to-high transition on the switching node.

Example 11: The apparatus of example 10 comprising an eighth transistor having a gate terminal coupled to a drain of the second transistor, wherein the eighth transistor has a source terminal coupled to a gate of the third transistor, and wherein the eighth transistor has a drain terminal coupled to a gate terminal of the second transistor.

Example 12: An apparatus comprising: a switching node; a stacked bridge having a high-side section coupled to a low-side section via the switching node, wherein each of the high-side section and the low-side section include three transistors coupled in series; and circuitry to pre-charge the switching node to a high voltage before the high-side section is turned on.

Example 13: The apparatus of example 12, wherein the high-side section comprises a first transistor, a second transistor, and a third transistor coupled in series, wherein the first transistor is coupled to an input power supply node, and wherein the second transistor is coupled between the first transistor and the third transistor.

Example 14: The apparatus of example 13, wherein the low-side section comprises fourth, fifth, and sixth transistor coupled in series, wherein the fourth transistor is coupled to a ground supply node, wherein the fifth transistor is coupled between the fourth and sixth transistors.

Example 15: The apparatus of example 14, wherein the circuitry comprises a p-type transistor coupled to a gate of the fifth transistor and a drain of the fourth transistor.

Example 16: The apparatus of example 12, wherein the circuitry is to pre-charge the switching node for about 50 ps.

Example 17: The apparatus of example 12, wherein the switching node is coupled to an inductor.

Example 18: A system comprising: a processor having one or more processor cores; a memory coupled to the processor; and a power management integrated circuit to provide power to the processor, where power management integrated circuit having a voltage regulator comprising: a switching node; a stacked bridge having a high-side section coupled to a low-side section via the switching node, wherein each of the high-side section and the low-side section include three transistors coupled in series; and circuitry to pre-charge the switching node to a high voltage before the high-side section is turned on.

Example 19: The system of example 18, wherein high-side section comprises a first transistor, a second transistor, and a third transistor coupled in series, wherein the first transistor is coupled to an input power supply node, and wherein the second transistor is coupled between the first transistor and the third transistor.

Example 20: The system of example 18, wherein the low-side section comprises fourth, fifth, and sixth transistor coupled in series, wherein the fourth transistor is coupled to a ground supply node, wherein the fifth transistor is coupled between the fourth and sixth transistors.

Example 21: An apparatus comprising: a high-side switch comprising one or more transistors coupled in series; a low-side switch coupled in series with the high-side switch, wherein the low-side switch comprises one or more transistors couples in series, wherein the high-side switch and the low-side switch are coupled to an inductor at a switching node; and a circuitry coupled to the high-side switch, wherein the circuitry is to perform controlled conductance modulation of the high-side switch during a charging phase of the inductor.

Example 22: The apparatus of example 21 comprises a power switch coupled in parallel to at least one transistor of the high-side switch.

Example 23: The apparatus of example 22, wherein the power switch is substantially smaller than the at least one transistor of the high-side switch.

Example 24: The apparatus of example 22, wherein the circuitry is to turn on the power switch before the high-side switch is turned on.

Example 25: The apparatus of example 22, wherein the circuitry is to pre-charge a switching node via the power switch to perform soft switching on the high-side switch or low-side switch.

Example 26: The apparatus of example 22, wherein the circuitry comprises: a detection circuit to detect low-to-high transition on the switching node; a first driver controllable by the detection circuit, wherein the first driver is to drive the at least one transistor of the high-side switch; and a second driver to drive the power switch prior to the first driver is to drive the at least one transistor of the high-side switch.

Example 27: A system comprising: a processor having one or more processor cores a memory coupled to the processor; and a power management integrated circuit to provide power to the processor, where power management integrated circuit having a voltage regulator comprising: a high-side switch comprising one or more transistors coupled in series; a low-side switch coupled in series with the high-side switch, wherein the low-side switch comprises one or more transistors couples in series, wherein the high-side switch and the low-side switch are coupled to an inductor at a switching node; and a circuitry coupled to the high-side switch, wherein the circuitry is to perform controlled conductance modulation of the high-side switch during a charging phase of the inductor.

Example 28: The system of example 27 comprises a power switch coupled in parallel to at least one transistor of the high-side switch.

Example 29: The system of example 28, wherein the power switch is substantially smaller than the at least one transistor of the high-side switch.

Example 30: The system of example 28, wherein the circuitry is to turn on the power switch before the high-side switch is turned on.

Example 31: The system of claim 28, wherein the circuitry is to pre-charge a switching node via the power switch to perform soft switching on the high-side switch or low-side switch.

Example 32: The system of example 28, wherein the circuitry comprises: a detection circuit to detect low-to-high transition on the switching node; a first driver controllable by the detection circuit, wherein the first driver is to drive the at least one transistor of the high-side switch; and a second driver to drive the power switch prior to the first driver is to drive the at least one transistor of the high-side switch.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a high-side section of a stacked bridge, the high-side section comprising a first transistor, second transistor, and third transistor coupled in series, wherein the first transistor is coupled to an input power supply node, and the second transistor is coupled between the first transistor and the third transistor;
a low-side section of the stacked bridge, wherein the low-side section is coupled in series with the high-side bridge at a switching node, the low-side section comprises fourth, fifth, and sixth transistors coupled in series, the fourth transistor is coupled to a ground supply node, and the fifth transistor is coupled between the fourth and sixth transistors; and
first circuitry to pre-charge the switching node before the first transistor is turned on;
wherein the high-side section comprises a seventh transistor coupled in parallel to the first transistor; and
second circuitry to turn on the seventh transistor before turning on the fifth transistor.

2. The apparatus of claim 1, wherein the first circuitry comprises a p-type transistor coupled to a gate of the fifth transistor and a drain of the fourth transistor.

3. The apparatus of claim 2, wherein the p-type transistor is smaller than the fifth transistor.

4. The apparatus of claim 1, wherein:
the first circuitry is to pre-charge the switching node through the fifth and sixth transistors after the fourth transistor is turned off;
the first circuitry is to pre-charge the switching node to a voltage substantially equal to Vdd-Vth;

Vth is a threshold voltage of the fourth transistor;
Vdd is a voltage applied to a control gate of the fifth transistor; and
Vdd is lower than a voltage on the input power supply node.

5. The apparatus of claim 1, wherein a voltage on the input power supply node is greater than 3V.

6. The apparatus of claim 1, wherein the seventh transistor is smaller than the first transistor.

7. The apparatus of claim 1, wherein the second circuitry includes a first driver to drive the first transistor and a second driver to drive the seventh transistor.

8. The apparatus of claim 7, wherein the second circuitry includes a detector to detect low-to-high transition on the switching node via a voltage on a drain of the first transistor, and to turn on the seventh transistor during the low-to-high transition on the switching node.

9. The apparatus of claim 6, wherein the seventh transistor comprises a gate terminal coupled to a drain of the second transistor, a source terminal coupled to a gate terminal of the third transistor, and a drain terminal coupled to a gate terminal of the second transistor.

10. An apparatus, comprising:
a switching node;
a high-side section of a stacked bridge coupled to the switching node; and
a low-side section of the stacked bridge coupled to the switching node, wherein the low-side section comprises:
first, second and third n-type transistors coupled in series;
a first p-type transistor coupled to a gate terminal of the third n-type transistor and to a gate terminal of the second n-type transistor;
a fourth n-type transistor coupled to a gate terminal of the second n-type transistor and to a drain of the first n-type transistor;
a second p-type transistor coupled to the gate terminal of the third n-type transistor and a gate terminal of the fourth n-type transistor; and
a voltage rail coupled to a drain terminal of the first p-type transistor, a gate terminal of the second p-type transistor, and a gate terminal of the second n-type transistor.

11. The apparatus of claim 10, wherein a drain terminal of the third n-type transistor is coupled to the switching node.

12. The apparatus of claim 11, wherein the first n-type transistor is coupled to a ground supply node, and the second n-type transistor is coupled between the first and third n-type transistors.

13. The apparatus of claim 10, wherein the low-side section is to pre-charge the switching node.

14. The apparatus of claim 10, wherein the switching node is coupled to an inductor.

15. A system, comprising:
a processor having one or more processor cores;
a memory coupled to the processor; and
a power management integrated circuit to provide power to the processor, where the power management integrated circuit has a voltage regulator comprising:
a switching node; and
a stacked bridge having a high-side section coupled to a low-side section via the switching node, wherein;
the high-side section comprises first, second and third transistors coupled in series;

the low-side section comprises fourth, fifth and sixth transistors coupled in series and a turn-on transistor;

the turn-on transistor comprises a gate terminal coupled to a drain of the fifth transistor, a source terminal coupled to a gate terminal of the sixth transistor, and a drain terminal coupled to a gate terminal of the fifth transistor; and the low-side section further comprises an additional transistor having a source terminal coupled to a gate terminal of the sixth transistor and a drain terminal coupled to a gate terminal of the turn-on transistor.

16. The system of claim 15, wherein the fourth transistor is coupled to a ground supply node, and the fifth transistor is coupled between the fourth and sixth transistors.

17. The apparatus of claim 1, wherein the first circuitry is to pre-charge the switching node through the fifth and sixth transistors after the fourth transistor is turned off.

18. The apparatus of claim 10, wherein the drain terminal of the fourth n-type transistor is coupled to the voltage rail and to the gate terminal of the second p-type transistor.

19. The system of claim 15, wherein the voltage regulator comprises circuitry to pre-charge the switching node before the high-side section is turned on.

20. The system of claim 15, wherein the additional transistor has a gate terminal coupled to a gate terminal of the fifth transistor.

\* \* \* \* \*

UNITED STATES PATENT AND TRADEMARK OFFICE
CERTIFICATE OF CORRECTION

| | |
|---|---|
| PATENT NO. | : 12,113,442 B2 |
| APPLICATION NO. | : 17/132814 |
| DATED | : October 8, 2024 |
| INVENTOR(S) | : Sally Amin |

It is certified that error appears in the above-identified patent and that said Letters Patent is hereby corrected as shown below:

In the Claims

Column 33
Lines 39-40 "… second transistor, and third transistor…" should read --… a second transistor, and a third transistor…--

Signed and Sealed this
Eighteenth Day of February, 2025

Coke Morgan Stewart
*Acting Director of the United States Patent and Trademark Office*